United States Patent
Park et al.

(10) Patent No.: US 12,381,767 B2
(45) Date of Patent: Aug. 5, 2025

(54) METHOD AND DEVICE FOR TRANSMITTING AND RECEIVING SIGNAL IN WIRELESS COMMUNICATION SYSTEM

(71) Applicant: Samsung Electronics Co., Ltd., Suwon-si (KR)

(72) Inventors: Yosub Park, Suwon-si (KR); Hyojin Lee, Suwon-si (KR); Hanjin Kim, Suwon-si (KR); Seunghyun Lee, Suwon-si (KR); Juho Lee, Suwon-si (KR); Jaehyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/267,320

(22) PCT Filed: Dec. 15, 2021

(86) PCT No.: PCT/KR2021/019106
§ 371 (c)(1),
(2) Date: Jun. 14, 2023

(87) PCT Pub. No.: WO2022/131797
PCT Pub. Date: Jun. 23, 2022

(65) Prior Publication Data
US 2024/0073077 A1 Feb. 29, 2024

(30) Foreign Application Priority Data

Dec. 15, 2020 (KR) .................. 10-2020-0175300
May 24, 2021 (KR) .................. 10-2021-0066015

(51) Int. Cl.
*H04L 27/26* (2006.01)

(52) U.S. Cl.
CPC ........ *H04L 27/262* (2013.01); *H04L 27/2627* (2013.01)

(58) Field of Classification Search
CPC ..... H04L 27/262; H04L 27/2627; H04L 1/00; H04L 5/00; H04L 5/0091; H04L 25/02;
(Continued)

(56) References Cited

U.S. PATENT DOCUMENTS

2006/0078066 A1 4/2006 Yun et al.
2006/0274641 A1* 12/2006 Grieco ................ H04L 27/2003
370/210
(Continued)

FOREIGN PATENT DOCUMENTS

KR 10-2003-0063665 A 7/2003
KR 10-2006-0010287 A 2/2006
(Continued)

OTHER PUBLICATIONS

A Review of Partial Transmit Sequence for PAPR Reduction in the OFDM Systems, Feb. 20, 2019.
(Continued)

*Primary Examiner* — David S Huang
(74) *Attorney, Agent, or Firm* — Jefferson IP Law, LLP

(57) ABSTRACT

Disclosed are a method and device for transmitting and receiving a signal in a wireless communication system. The method may comprise the following steps: transmitting, to a terminal, information of a plurality of demodulation reference signal (DMRS) sequences and information of a plurality of data transformation techniques, transforming a data symbol sequence on the basis of the plurality of data transformation techniques, performing an inverse discrete Fourier transformation (IDFT) on combinations of the plurality of transformed data symbol sequences and the plurality of DMRS sequences, measuring peak-to-average power ratio (PAPR) values with respect to each of the IDFT-performed signals, selecting an IDFT-performed signal having the lowest PAPR value as a result of the measurement,
(Continued)

and the selected IDFT-performed signal may be transmitted to a terminal.

18 Claims, 27 Drawing Sheets

(58) Field of Classification Search
CPC ........... H04L 25/0224; H04L 27/26134; H04L 27/2614; H04L 27/2636; H04L 27/26526; H04L 27/2628; H04L 1/0047; H04L 1/0071; H04L 5/0044; H04L 5/0051; H04L 5/0053; H04L 27/26136; H04L 27/2695

See application file for complete search history.

(56) References Cited

U.S. PATENT DOCUMENTS

| | | |
|---|---|---|
| 2008/0008084 A1 | 1/2008 | Son |
| 2018/0131485 A1 | 5/2018 | Wang et al. |
| 2019/0036746 A1 | 1/2019 | Hwang et al. |
| 2019/0090201 A1 | 3/2019 | Akkarakaran et al. |
| 2020/0221435 A1 | 7/2020 | Kim et al. |
| 2021/0135919 A1 | 5/2021 | Lee et al. |
| 2021/0234740 A1* | 7/2021 | Eger ................... H04L 25/067 |

FOREIGN PATENT DOCUMENTS

| | | |
|---|---|---|
| KR | 10-2006-0031924 A | 4/2006 |
| KR | 10-2018-0091696 A | 8/2018 |
| KR | 10-2019-0074283 A | 6/2019 |
| KR | 10-2020-0052890 A | 5/2020 |
| KR | 10-2020-0058558 A | 5/2020 |
| WO | 2017/135693 A1 | 8/2017 |
| WO | 2018/139782 A1 | 8/2018 |
| WO | 2020/050653 A1 | 3/2020 |

OTHER PUBLICATIONS

A Reliable Uplink Control Channel Design with Complementary Sequences, Apr. 1, 2019.
Eurecom et al., Low-PAPR Sequence-Based Approaches for PUCCH Coverage Enhancement, R1-2008759, 3GPP TSG-RAN WG1 Meeting #103, e-Meeting, Nov. 1, 2020.

* cited by examiner

METHOD AND DEVICE FOR TRANSMITTING AND RECEIVING SIGNAL IN WIRELESS COMMUNICATION SYSTEM

TECHNICAL FIELD

The disclosure relates to a method and apparatus for transmitting and receiving a signal in a wireless communication system.

BACKGROUND ART

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

DETAILED DESCRIPTION OF THE INVENTION

Technical Problem

The disclosure proposes a method and apparatus for transmitting and receiving signals in a wireless communication system.

The disclosure proposes a method and apparatus for reducing a peak to average power ratio (PAPR) in a wireless communication system.

The disclosure proposes a method and apparatus for selecting a reference signal sequence for PAPR reduction in an orthogonal frequency division multiplexing (OFDM) communication system.

The disclosure proposes a data transformation scheme and apparatus for PAPR reduction in an OFDM communication system.

Technical Solution

A base station (BS) in a wireless communication system according to an embodiment of the disclosure may include a transceiver and at least one processor connected to the transceiver. The at least one processor may transmit information about a plurality of demodulation reference signal (DMRS) sequences and information about a plurality of data transformation schemes to a user equipment (UE), transform a data symbol sequence based on the plurality of data transformation schemes, perform inverse discrete Fourier transform (IDFT) on combinations of the plurality of transformed data symbol sequences and the plurality of DMRS sequences, measure a peak-to-average power ratio (PAPR) value of each of the IDFT-performed signals, select an IDFT-performed signal having a lowest PAPR value as a result of the measurement, and transmit the selected IDFT-performed signal to the UE.

A UE in a wireless communication system according to an embodiment of the disclosure may include a transceiver and at least one processor connected to the transceiver. The at least one processor may receive information about a plurality of DMRS sequences and information about a plurality of data transformation schemes from a BS, determine whether control information including a data transformation index indicating one data transformation scheme and a DMRS sequence index indicating one DMRS sequence is received from the BS, when determining that the control information is received, receive the control information including the data transformation index and the DMRS sequence index from the BS, perform channel estimation on a signal received from the BS based on the DMRS sequence indicated by the DMRS sequence index, perform channel compensation on a data signal included in the received signal based on estimated channel information, inversely transform the channel-compensated signal based on the data transformation scheme indicated by the data transformation index, and demodulate and decode the inversely transformed signal.

A method of a BS in a wireless communication system according to an embodiment of the disclosure may include transmitting information about a plurality of DMRS sequences and information about a plurality of data transformation schemes to a UE, transforming a data symbol sequence based on the plurality of data transformation schemes, performing IDFT on combinations of the plurality of transformed data symbol sequences and the plurality of DMRS sequences, measuring a PAPR value of each of the IDFT-performed signals, selecting an IDFT-performed signal having a lowest PAPR value as a result of the measurement, and transmitting the selected IDFT-performed signal to the UE.

A method of a UE in a wireless communication system according to an embodiment of the disclosure may include receiving information about a plurality of DMRS sequences and information about a plurality of data transformation schemes from a BS, determining whether control information including a data transformation index indicating one data transformation scheme and a DMRS sequence index indicating one DMRS sequence is received from the BS, when determining that the control information is received, receiving the control information including the data transformation index and the DMRS sequence index from the BS, performing channel estimation on a signal received from the BS based on the DMRS sequence indicated by the DMRS sequence index, performing channel compensation on a data signal included in the received signal based on estimated channel information, inversely transforming the channel-compensated signal based on the data transformation scheme indicated by the data transformation index, and demodulating and decoding the inversely transformed signal.

A UE in a wireless communication system according to an embodiment of the disclosure may include a transceiver, and at least one processor connected to the transceiver. The at least one processor may measure a PAPR of a data signal, determine whether the measured PAPR is greater than a PAPR_threshold, when the measured PAPR is greater than the PAPR_threshold, select a data transformation index having a smallest PAPR among a plurality of data transformation indexes based on a first method of deriving a data transformation index for PAPR reduction or a second method based on the plurality of data transformation indexes and the data signal, transmit information related to the selected data transformation index to a BS through the transceiver, and transmit a transformed data signal generated by applying a data transformation corresponding to the selected data transformation index to the data signal to the BS through the transceiver.

A BS in a wireless communication system according to an embodiment of the disclosure may include a transceiver, and at least one processor connected to the transceiver. The at least one processor may determine whether information related to a data transformation index is received from a UE, and when determining that the information related to the data transformation index is received, inversely transform a data signal received from the UE based on the received information related to the data transformation index.

Other aspects, benefits and essential features of the disclosure will become apparent to those skilled in the art from the following detailed description, taken in conjunction with the accompanying drawings, and disclosing preferred embodiments of the disclosure.

Before undertaking the detailed description of the disclosure, it may be advantageous to set forth definitions of certain words and phrases used throughout this patent document: the terms "include" and "comprise," as well as derivatives thereof, mean inclusion without limitation, the term "or" is inclusive, meaning 'and/or', the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like, and the term "controller" means any device, system or part thereof that controls at least one operation, whether such a device is implemented in hardware, firmware, software or some combination of at least two of the same.

Advantageous Effects

According to various embodiments of the disclosure, a PAPR may be reduced during transmission of an OFDM-based signal on downlink, for wireless communication.

MODE FOR CARRYING OUT THE INVENTION

Figure 1:
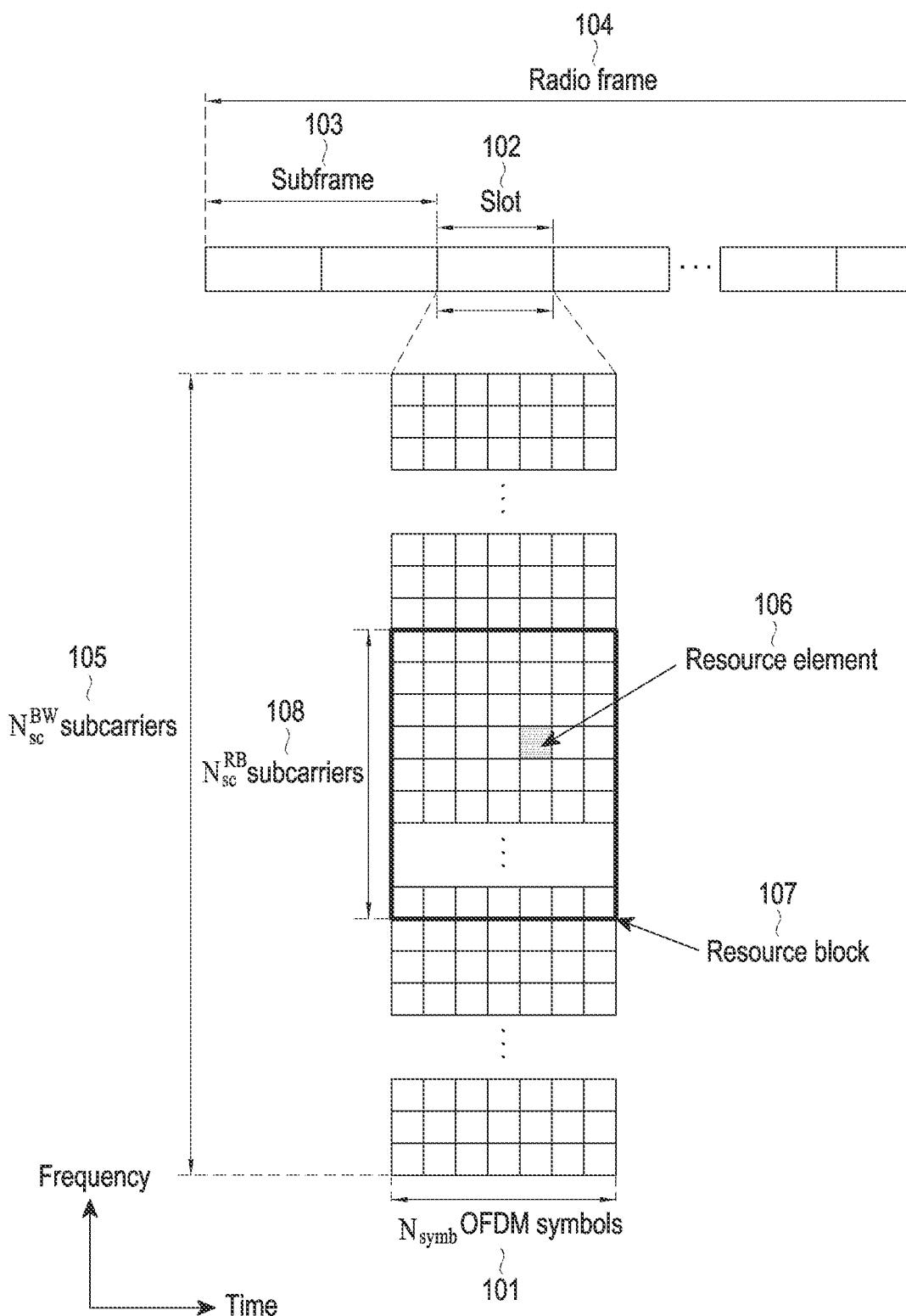
FIG. 1 illustrates the basic structure of a time-frequency domain, which is a radio resource area carrying data or a control channel in an LTE system.

Embodiments of the disclosure are described below in detail with reference to the accompanying drawings. It is to be noted that like reference numerals denote the same components, if possible. Lest it should obscure the subject matter of the disclosure, a detailed description of functions and constructions known in the art will be shortened or avoided.

The terms as described later are defined in consideration of functions in the disclosure, and may be changed according to the intention of a user or an operator, or customs. Therefore, the definitions should be made, not simply by the actual terms used but by the meanings of each term lying within.

Various modifications can be made to the disclosure, and the disclosure may have various embodiments. However, it should be appreciated that the disclosure covers all modifications, equivalents, and alternatives within the spirit and scope of the disclosure.

Further, a singular form such as "a/an" or "the" may include plural referents, unless the relevant context clearly indicates otherwise. Accordingly, for example, "a component" may include one or more components".

Terms including ordinal numbers such as $1^{st}$, $2^{nd}$, first, or second may be used to describe various components, not limiting the components. These expressions are used simply to distinguish one component from another component. For example, a first component may be referred to as a second component and vice versa within the scope of the disclosure. The term and/or includes a combination or any one of a plurality of related described items.

Further, the terms as used in the specification are used to describe a specific embodiment, not intended to limit the disclosure. Singular forms used in the disclosure include plural referents unless the context clearly dictates otherwise. In this specification, the term "have", "may have", "include", or "may include" just specifies the existence of features, numbers, steps, operations, components, parts, or a combination thereof described in the specification, and should not be interpreted as excluding the existence of or the possibility of adding one or more other features, numbers, steps, operations, components, parts, or a combination thereof.

Various embodiments as set forth herein may be implemented as software (e.g., a program) including one or more instructions that are stored in a storage medium (e.g., internal memory or external memory) that is readable by an electronic device. For example, a processor of the electronic device may invoke at least one of the one or more instructions stored in the storage medium, and execute it. This allows the device to be operated to perform at least one function according to the at least one instruction invoked. The one or more instructions may include a code generated by a complier or a code executable by an interpreter. The electronic device-readable storage medium may be provided in the form of a non-transitory storage medium. Wherein, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a block or a program) of the disclosure may include a single entity or multiple entities. According to various embodiments, one or more of the above-described components may be omitted, or one or more other components may be added. Alternatively or additionally, a plurality of components (e.g., blocks or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Further, according to an embodiment of the disclosure, an electronic device may provide a channel for wireless communication with a terminal. The electronic device may refer to a base station (BS), an access network (AN), a radio access network (RAN), an eNB, an eNodeB, a 5G node, a transmission/reception point (TRP), or a $5^{th}$ generation Node B (5 gNB). For convenience, embodiments of the disclosure will be described below in the context of a BS as an electronic device. A terminal may be a user equipment (UE), a mobile station, a subscriber station, a remote terminal, a wireless terminal, or a user device, which communicates with a BS through a radio channel. In addition, according to an embodiment of the present disclosure, a MIMO system may be implemented in various wireless communication systems supporting MIMO as a multi-antenna technology, such as a long-term evolution (LTE) system, a long-term evolution-advanced (LTE-A) system, an LTE-A pro system, or the afore-mentioned 5G system, which has been proposed by the $3^{rd}$ generation partnership project (3GPP).

Further, according to embodiments of the disclosure, the terms including technical or scientific terms used in the disclosure may have the same meanings as generally understood by those skilled in the art, unless otherwise defined. The terms as generally defined in dictionaries may be interpreted as having the same or similar meanings as or to contextual meanings of related technology. Unless otherwise defined, the terms should not be interpreted as ideally or excessively formal meanings.

It should be noted that functionality associated with any particular controller may be centralized or distributed and localized or remote. Definitions of certain words and phrases are provided throughout this patent document, and those skilled in the art will understand that in many, if not most, cases, such definitions are applied to future uses of the defined words and phrases as well as to conventional uses thereof.

However, the disclosure is not limited to the embodiments disclosed below and will be implemented in various different forms. The embodiments are provided only to make the disclosure complete and fully inform those skilled in the art of the scope of the disclosure, and the disclosure is only defined by the scope of the claims.

Beyond the initial voice-centered service, wireless communication systems are evolving into broadband wireless communication systems that provide high-speed, high-quality packet data services, such as 3GPP communication standards including high speed packet access (HSPA), long term evolution (LTE) or evolved universal terrestrial radio access (E-UTRA), LTE-advanced (LTE-A), and LTE-Pro, and 3GPP2 standards including high rate packet data (HRPD), ultra mobile broadband (UMB), and IEEE 802.16e.

A representative example of the broadband wireless communication systems, LTE adopts orthogonal frequency division multiplexing (OFDM) for downlink (DL) and single carrier frequency division multiple access (SC-FDMA) for uplink (UL). UL refers to a radio link on which a UE transmits data or a control signal to a BS (e.g., an eNode B), and DL refers to a radio link on which a BS transmits data or a control signal to a UE. In the above multiple access schemes, data or control information of each user may be identified by allocating and operating time-frequency resources to carry the data or the control information in such a manner that they do not overlap, that is, orthogonality is established between them.

The post LTE communication system, that is, the 5G communication system should be able to freely reflect various requirements of users and service providers, and thus support services satisfying various requirements. Services considered for the 5G communication system include enhanced mobile broadband (eMBB), massive machine type communication (mMTC), ultra reliability low latency communication (URLLC), and so on.

eMBB aims to provide a higher data transmission rate than a data transmission rate supported by legacy LTE, LTE-A, or LTE-Pro. For example, eMBB should be able to provide up to 20 Gbps on DL and up to 10 Gbps on UL from the viewpoint of one BS in the 5G communication system. Further, the 5G system should provide an increased user-perceived data rate as well as a maximum transmission rate. To satisfy this requirement, various transmission/reception techniques need improvement, including advanced multiple input multiple output (MIMO) transmission technology. In addition, use of a wider frequency bandwidth than 20 MHz used in current LTE in a frequency band at 3 to 6 GHz or above 6 GHz may satisfy the data transmission rate required for the 5G communication system.

In the 5G communication system, mMTC is considered to support application services such as Internet of things (IoT). In order to efficiently provide IoT, mMTC may require massive UE access support, improved UE coverage, an improved battery life, and reduced UE cost in a cell. Since IoT provides a communication function through attachment to various sensors and various devices, IoT should be able to support a large number of UEs (e.g., 1,000,000 UEs/km$^2$) within a cell. In addition, since a UE supporting mMTC is highly likely to be located in a shaded area that the cell does not cover such as the basement of a building in view of the nature of the service, it may require wider coverage compared to other services provided by the 5G communication system. The UE supporting mMTC should be configured as a low-cost UE, and since it is difficult to frequently exchange the battery of the UE, a very long battery life time may be required.

Finally, URLLC, which is a cellular-based wireless communication service serving a specific (mission-critical) purpose, is used for remote control of a robot or a machine, industrial automation, unmanned aerial vehicles, remote healthcare, emergency alert, and so on, and should provide ultra-low latency and ultra-reliability communication. For example, a service supporting URLLC should satisfy an air interface latency less than 0.5 ms and has a requirement of a packet error rate of $10^{-5}$ or less. Therefore, for a service supporting URLLC, the 5G system should provide a smaller transmit time interval (TTI) than other services, and has a design requirement of allocation of wide resources in a frequency band.

The three services of 5G, that is, eMBB, URLLC, and mMTC may be multiplexed and transmitted in one system. To satisfy different requirements of the services, different transmission/reception techniques and transmission/reception parameters may be used for the services.

A frame structure in the LTE and LTE-A systems will be described in greater detail with reference to the drawings.

FIG. 1 is a diagram illustrating a basic structure of a time-frequency domain, which is a radio resource area carrying data or a control channel in the LTE system.

In FIG. 1, a horizontal axis represents a time domain and a vertical axis represents a frequency domain. A minimum transmission unit in the time domain is an OFDM symbol. $N_{symb}$ OFDM symbols 101 form one slot 102, and two slots form one subframe 103. The length of a slot is 0.5 ms, and the length of a subframe is 1.0 ms. A radio frame 104 is a time-domain unit including 10 subframes. A minimum transmission unit in the frequency domain is a subcarrier, and a total system transmission bandwidth includes a total of $N_{BW}$ subcarriers 105. A basic unit of resources in the time-frequency domain is a resource element (RE) 106, which may be represented by an OFDM symbol index and a subcarrier index. A resource block (RB) or physical resource block (PRB) 107 is defined by $N_{symb}$ consecutive OFDM symbols 105 in the time domain and $N_{RB}$ consecutive subcarriers 108 in the frequency domain. Therefore, one RB 107 is composed of $N_{symb} \times N_{RB}$ REs 106. In general, a minimum transmission unit of data is an RB. In the LTE system, $N_{symb}=7$ and $N_{RB}=12$, and $N_{BW}$ and $N_{RB}$ are proportional to the system transmission bandwidth.

Now, downlink control information (DCI) in the LTE and LTE-A systems will be described in detail.

In the LTE system, scheduling information for DL data or UL data is transmitted from a BS to a UE through DCI. Various formats are defined for DCI, and a predetermined DCI format is applied according to whether the DCI is scheduling information for UL data or scheduling information for DL data, whether the DCI is compact DCI with a small size of control information, whether spatial multiplexing using multiple antennas is applied, and whether the DCI is for power control. For example, DCI format 1, which is scheduling control information for DL data, is configured to include at least the following control information.

Resource allocation type 0/1 flag: indicates whether a resource allocation scheme is type 0 or type 1. Type 0 allocates resources in units of a resource block group (RBG) by applying a bitmap method. In the LTE system, a basic unit of scheduling is an RB represented by time and frequency-domain resources, and an RBG is composed of a plurality of RBs and is a basic unit of scheduling in type 0. Type 1 allocates a specific RB within an RBG.

Resource block assignment: indicates RBs allocated for data transmission. Resources to be represented are determined according to a system bandwidth and a resource allocation scheme.

Modulation and coding scheme (MCS): indicates a modulation scheme used for data transmission and the size of a transport block which is data to be transmitted.

HARQ process number: indicates an HARQ process number.

New data indicator: indicates an HARQ initial transmission or an HARQ retransmission.

Redundancy version: indicates the redundancy version of HARQ.

Transmit power control (TPC) command for physical uplink control channel (PUCCH): indicates a TPC command for a UL control channel, PUCCH.

The DCI is transmitted through a DL physical control channel, physical downlink control channel (PDCCH) by a channel coding and modulation process.

A cyclic redundancy check (CRC) is attached to payload of the DCI message. The CRC is scrambled with a radio network temporary identifier (RNTI) corresponding to a UE identity (ID). Different RNTIs are used according to the purposes of a DCI message, for example, UE-specific data transmission, a power control command, or a random access response. The RNTI is included in a CRC calculation process and transmitted rather than it is transmitted explicitly. Upon receipt of the DCI message on the PDCCH, the UE identifies the CRC by using an allocated RNTI, and if the CRC check result is correct, the UE may identify that the corresponding message is for the UE.

Figure 2:
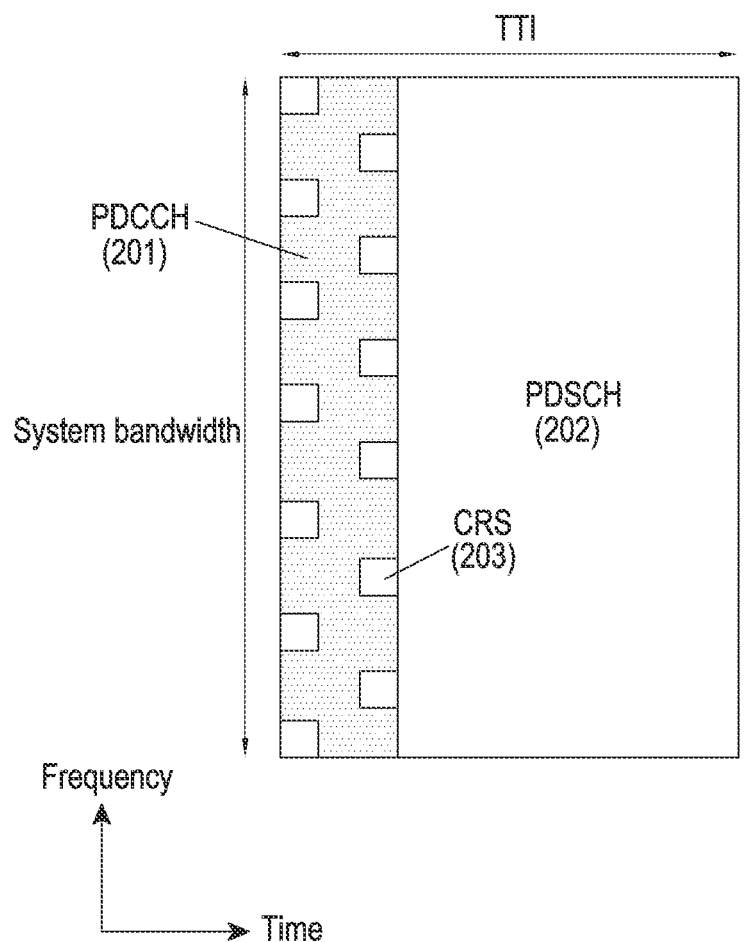
FIG. 2 illustrates a physical downlink control channel (PDCCH), which is a downlink physical channel in an LTE system.

FIG. 2 is a diagram illustrating a PDCCH 201, which is a DL physical channel in an LTE system.

According to FIG. 2, the PDCCH 201 is time-multiplexed with a data transmission channel, PDSCH 202 and transmitted over an entire system bandwidth. The area of the PDCCH 201 is represented by the number of OFDM symbols, which is indicated to a UE by a control format indicator (CFI) transmitted through a physical control format indicator channel (PCFICH). As the PDCCH 201 is allocated to a starting OFDM symbol of a subframe, the UE may decode a DL scheduling assignment as quickly as possible, and thus the decoding delay of a downlink shared channel (DL-SCH), that is, an overall DL transmission delay may be advantageously reduced. Since one PDCCH carries one DCI message and multiple UEs may be simultaneously scheduled for DL and UL, multiple PDCCHs are simultaneously transmitted in each cell. A cell-specific reference signal (CRS) 203 is used as a reference signal for decoding the PDCCH 201. The CRS 203 is transmitted in each subframe across an entire band, and scrambling and resource mapping vary according to a cell ID. Since the CRS 203 is a reference signal common to all UEs, UE-specific beamforming may not be used. Therefore, a multi-antenna transmission technique for the LTE PDCCH is limited to open-loop transmission diversity. The number of CRS ports is implicitly known to the UE from decoding of a physical broadcast channel (PBCH).

Resource allocation for the PDCCH 201 is based on a control-channel element (CCE), and one CCE is composed of 9 REGs, that is, a total of 36 REs. The number of CCEs required for the specific PDCCH 201 may be 1, 2, 4, or 8, which depends on the channel coding rate of the payload of the DCI message. As such, a different number of CCEs are used to implement link adaptation of the PDCCH 201. The UE should detect a signal without information about the PDCCH 201. In LTE, a search space representing a set of CCEs is defined for blind decoding. The search space is composed of a plurality of sets at each CCE aggregation level (AL), which is not explicitly signaled but implicitly defined through a function and a subframe number according to a UE ID. Within each subframe, the UE decodes the PDCCH 201 for all possible resource candidates that may be created from CCEs within a configured search space, and processes information declared valid for the corresponding UE through a CRC check.

Search spaces are classified into a UE-specific search space and a common search space. A certain group of UEs or all UEs may monitor the common search space of the PDCCH 201 in order to receive cell-common control information such as dynamic scheduling for system information or a paging message. For example, scheduling allocation information for a DL-SCH for transmission of system information block (SIB)-1 including cell operator information may be received by monitoring the common search space of the PDCCH 201.

In LTE, an entire PDCCH region is composed of a set of CCEs in a logical area, and there is a search space composed of a set of CCEs. Search spaces are classified into a common search space and a UE-specific search space, and a search space for the LTE PDCCH is defined as follows.

The set of PDCCH candidates to monitor are defined in terms of search spaces, where a search space $S_k^{(L)}$ at aggregation level $L \in \{1,2,4,8\}$ is defined by a set of PDCCH candidates. For each serving cell on which PDCCH is monitored, the CCEs corresponding to PDCCH candidate m of the search space $S_k^{(L)}$ are given by $$L\{(Y_k+m') \bmod \lfloor N_{CCE,k}/L \rfloor\}+i$$

where $Y_k$ is defined below, i=0, ..., L−1. For the common search space m'=m. For the PDCCH UE specific search space, for the serving cell on which PDCCH is monitored, if the monitoring UE is configured with carrier indicator field then $m'=m+M^{(L)} \cdot n_{CI}$ where $n_{CI}$ is the carrier indicator field value, else if the monitoring UE is not configured with carrier indicator field then m'=m, where m=0, ..., $M^{(L)}$−1. $M^{(L)}$ is the number of PDCCH candidates to monitor in the given search space.

Note that the carrier indicator field value is the same as ServCellIndex

For the common search spaces, $Y_k$ is set to 0 for the two aggregation levels L=4 and L=8.

For the UE-specific search space $S_k^{(L)}$ at aggregation level L, the variable $Y_k$ is defined by $$Y_k = (A \cdot Y_{k-1}) \bmod D$$

where $Y_{-1} = n_{RNTI} \neq 0$, A=39827, D=65537 and $k=\lfloor n_S/2 \rfloor$, $n_S$ is the slot number within a radio frame. The RNTI value used for $n_{RNTI}$ is defined in subclause 7.1 in downlink and subclause 8 in uplink.

According to the definition of the search space for the PDCCH described above, the UE-specific search space is not explicitly signaled, but is implicitly defined through a function and a subframe number according to a UE ID. In other words, since the UE-specific search space may change according to a subframe number, this means that the UE-specific search space may change over time, and thus the problem (blocking problem) that a specific UE may not use the search space due to other UEs among UEs is solved. If a UE may not be scheduled in a subframe because all CCEs monitored by the UE are already used by other UEs scheduled in the same subframe, this problem may not occur in a next subframe because this search space changes over time. For example, even if UE-specific search spaces of UE #1 and UE #2 partially overlap with each other in a specific subframe, it may be expected that overlap in a next subframe may be different because the UE-specific search spaces change in each subframe.

According to the above-described definitions of the search spaces for the PDCCH, a common search space is defined as a preset CCE set because a certain group of UEs or all UEs should receive the PDCCH. In other words, the common search space does not change according to a UE ID or a subframe number. Although the common search space exists for transmission of various system messages, it may also be used to transmit control information for an individual UE. Accordingly, the common search space may also be used as a solution to the phenomenon that a UE is not scheduled due to insufficient resources available in a terminal-specific search space.

A search space is a set of candidate control channels including CCEs that the UE should attempt to decode at a given aggregation level. Because there are a plurality of aggregation levels that group 1, 2, 4, and 8 CCEs, respectively, the UE has a plurality of search spaces. The number of PDCCH candidates to be monitored by the UE within the search spaces defined according to the aggregation levels in the LTE PDCCH is defined in the following table.

TABLE 1

| | Search space $S_k^{(L)}$ | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

According to Table 1, in the case of a UE-specific search space, aggregation levels {1, 2, 4, 8} are supported, and {6, 6, 2, 2} PDCCH candidate groups are respectively provided herein. In the case of a common search space 302, aggregation levels {4, 8} are supported, and {4, 2} PDCCH candidate groups are respectively provided herein. The reason why the common search space supports only aggregation levels {4, 8} is to improve coverage characteristics because system messages should generally reach cell edges.

DCI transmitted in the common search space is defined only for a specific DCI format such as 0/1A/3/3A/1C corresponding to a purpose such as a system message or power control for a UE group. In the common search space, a DCI format with spatial multiplexing is not supported. A DL DCI format to be decoded in a UE-specific search space depends on a transmission mode configured for the corresponding UE. Since the transmission mode is configured by radio resource control (RRC) signaling, an exact subframe number in which the corresponding configuration is effective for the corresponding UE is not specified. Therefore, the UE may be operated not to lose communication by always performing decoding for DCI format 1A regardless of the transmission mode.

A method and search space for transmitting and receiving a DL control channel and DCI in legacy LTE and LTE-A have been described above.

A detailed description will be given below of a DL control channel in a 5G communication system under discussion with reference to the drawings.

Figure 3:
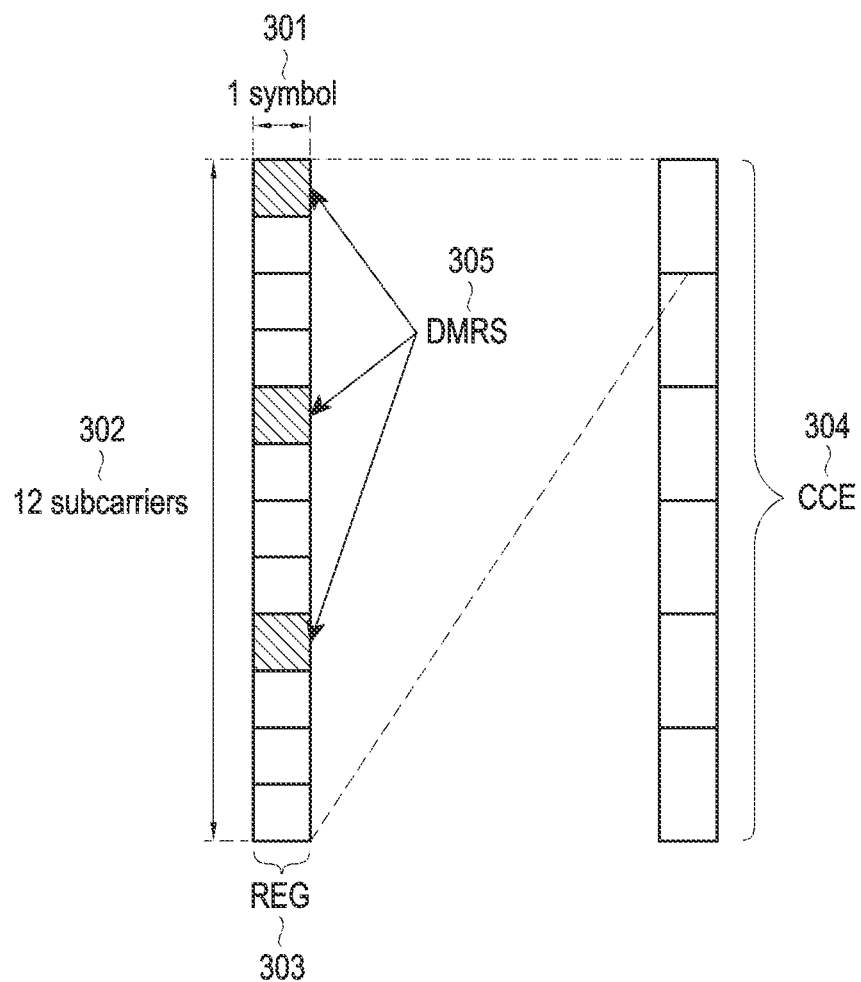
FIG. 3 illustrates an example of time and frequency resources of a downlink control channel usable in a 5G system.

FIG. 3 is a diagram illustrating an embodiment of time and frequency resources of a DL control channel available in a 5G system. According to FIG. 3, a basic unit (REG) of time and frequency resources forming a control channel is composed of one OFDM symbol 301 on the time axis and 12 subcarriers 302, that is, one RB on the frequency axis. As a basic time unit is assumed to be one OFDM symbol 301 in configuring a basic unit for a control channel, a data channel and the control channel may be time-multiplexed in one subframe. As the control channel precedes the data channel, a user's processing time may be reduced, making it easy to satisfy a latency requirement. Frequency multiplexing between the control channel and the data channel may be performed more efficiently by configuring a basic frequency unit of the control channel as one RB 302.

A control channel region may be configured in various sizes by concatenating REGs 303 illustrated in FIG. 3. For example, when a basic unit to which a DL control channel is allocated in 5G is a CCE 304, the CCE 304 may include a plurality of REGs 303. An REG 304 illustrated in FIG. 3 will be taken as an example. If an REG 303 includes 12 REs, and one CCE 304 includes 6 REGs 303, this means that one CCE 304 may include 72 REs. When a DL control region is configured, the region may include a plurality of CCEs 304, and a specific DL control channel may be mapped to one or more CCEs 304 according to the aggregation level (AL) of the control region, prior to transmission. The CCEs 304 in the control region may be identified by indexes, and the indexes may be assigned according to a logical mapping method.

The basic unit of the DL control channel, that is, an REG 303 illustrated in FIG. 3 may include REs to which DCI is mapped and a region to which a reference signal for decoding the REs, demodulation reference signal (DMRS) 305 is mapped. As illustrated in FIG. 3, the DMRS 305 may be transmitted in 6 REs within one REG 303. For reference, since the DMRS 303 is transmitted using the same precoding as a control signal mapped in the REG 303, the UE may decode control information even without information about the precoding applied by a BS.

Figure 4:
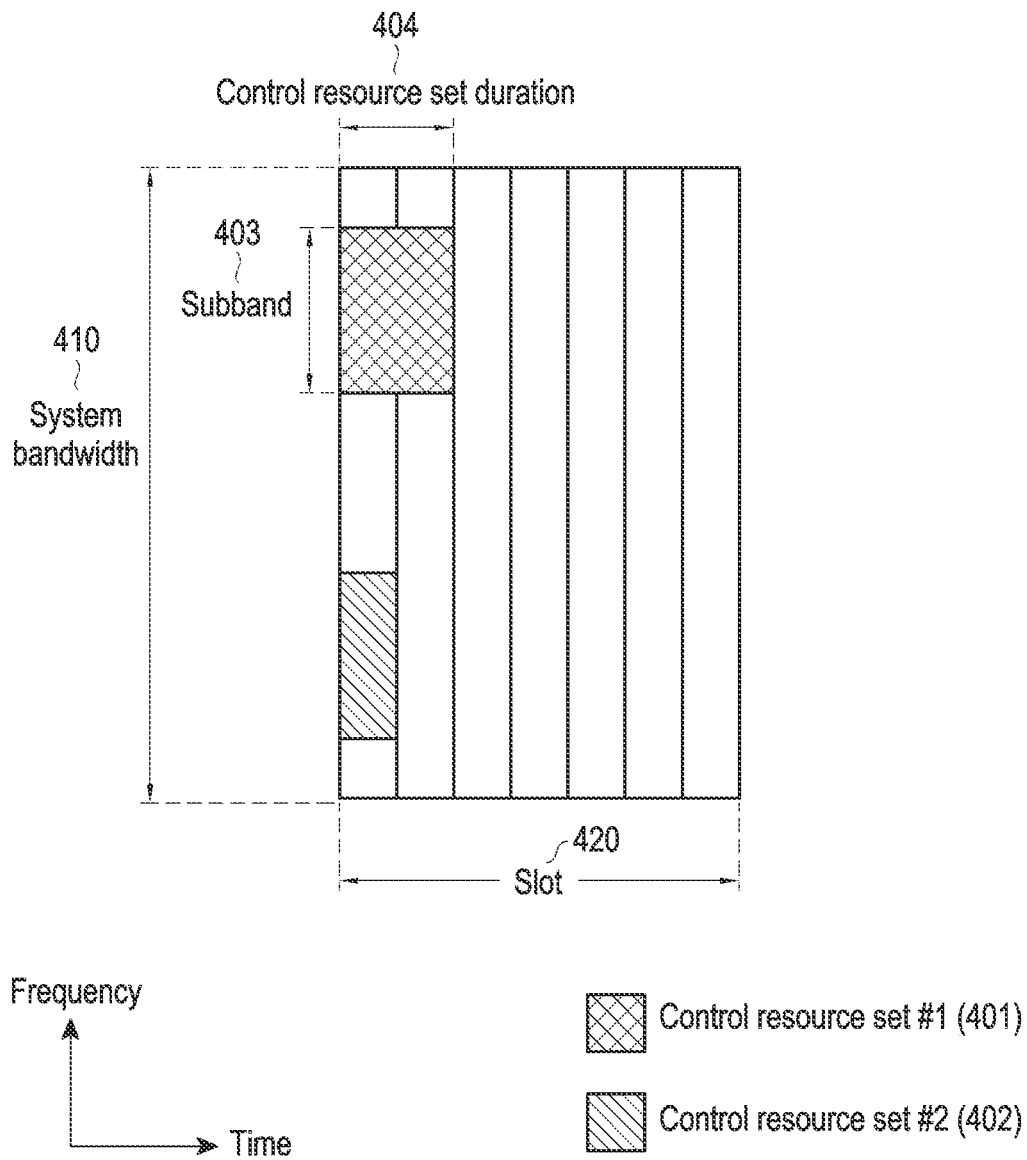
FIG. 4 illustrates an example of a control region (CORESET) in which a downlink control channel is transmitted in a 5G system.

FIG. 4 is a diagram illustrating an example of a control resource set (CORESET) in which a DL control channel is transmitted in a 5G wireless communication system. In the example of FIG. 4, two control regions (control region #1 401 and control region #2 402) are configured in a system bandwidth 410 on the frequency axis and one slot on the time axis (it is assumed that one slot includes 7 OFDM symbols in the example of FIG. 4). The control regions 401 and 402 may be configured in specific subbands 403 within the entire system bandwidth 410 on the frequency axis. One or more OFDM symbols may be configured, and this may be defined as a control resource set duration 404. In the example of FIG. 4, control region #1 401 is configured in a control resource set duration of 2 symbols, and control region #2 402 is configured in a control resource set duration of 1 symbol.

A BS may configure the above-described control region in 5G for a UE by higher layer signaling (e.g., system information, a master information block (MIB), or RRC signaling). Configuring a control region for a UE means providing information such as the position of the control region, a subband, resource allocation for the control region, and the length of the control region. For example, it may include the following information.

TABLE 2 configuration information 1. frequency-axis RB allocation information
configuration information 2. starting symbol of control region
configuration information 3. symbol length of control region
configuration information 4. REG bundling size (2 or 3 or 6)
configuration information 5. transmission mode (interleaved transmission scheme or non-interleaved transmission scheme)
configuration information 6. DMRS configuration information (precoder granularity)
configuration information 7. search space type (common search space, group-common search space, UE-specific search space)
configuration information 8. DCI format to be monitored in corresponding control region
others In addition to the above configuration information, various pieces of information necessary for transmitting a DL control channel may be configured for the UE.

DCI in 5G will be described below in detail.

In a 5G system, scheduling information for UL data (physical uplink shared channel (PUSCH)) or DL data (physical downlink shared channel (PDSCH)) is transmitted in DCI from a BS to a UE. The UE may monitor a DCI format for fallback and a DCI format for non-fallback with respect to a PUSCH or a PDSCH. The fallback DCI format may include a fixed field between the BS and the UE, and the non-fallback DCI format may include a configurable field.

Fallback DCI for scheduling a PUSCH may include, for example, the following information.

TABLE 3

Identifier for DCI formats-[1] bit
Frequency domain resource assignment-
$[\lceil \log_2(N_{RB}^{UL,BWP}(N_{RB}^{UL,BWP} + 1)/2) \rceil ]$ bits
Time domain resource assignment-X bits
Frequency hopping flag-1 bit.
Modulation and coding scheme-[5] bits
New data indicator-1 bit
Redundancy version-[2] bits
HARQ process number-[4] bits
TPC command for scheduled PUSCH-[2] bits
UL/SUL indicator-0 or 1 bit Non-fallback DCI for scheduling a PUSCH may include, for example, the following information.

TABLE 4

Carrier indicator - 0 or 3 bits
Identifier for DCI formats - [1] bits
Bandwidth part indicator - 0, 1 or 2 bits
Frequency domain resource assignment
For resource allocation type 0, $\lceil N_{RB}^{UL,BWP}/P \rceil$ bits
For resource allocation type 1, $\lceil \log_2(N_{RB}^{UL,BWP}(N_{RB}^{UL,BWP} + 1)/2) \rceil$ bits
Time domain resource assignment -1, 2, 3, or 4 bits
VRB-to-PRB mapping - 0 or 1 bit, only for resource allocation type 1.
0 bit if only resource allocation type 0 is configured;
1 bit otherwise.
Frequency hopping flag - 0 or 1 bit, only for resource allocation type 1.
0 bit if only resource allocation type 0 is configured;
1 bit otherwise.
Modulation and coding scheme - 5 bits
New data indicator - 1 bit
Redundancy version - 2 bits as defined in section x.x of [6, TS38.214]
HARQ process number - 4 bits
1st downlink assignment index - 1 or 2 bits
1 bit for semi-static HARQ-ACK codebook;
2 bits for dynamic HARQ-ACK codebook with single HARQ-ACK codebook.
2nd downlink assignment index - 0 or 2 bits
2 bits for dynamic HARQ-ACK codebook with two HARQ-ACK sub-codebooks;
0 bit otherwise.

TPC command for scheduled PUSCH - 2 bits $SRS$ resource indicator — $\left\lceil \log_2\left( \sum_{k=1}^{L_{max}} \binom{N_{SRS}}{k} \right) \right\rceil$ or $\lceil \log_2(N_{SRS}) \rceil$ bits $\left\lceil \log_2\left( \sum_{k=1}^{L_{max}} \binom{N_{SRS}}{k} \right) \right\rceil$ bits for non-codebook based $PUSCH$ transmission;

$\lceil \log_2(N_{SRS}) \rceil$ bits for codebook based PUSCH transmission.
Precoding information and number of layers - up to 6 bits
Antenna ports - up to 5 bits
SRS request - 2 bits
CSI request - 0, 1, 2, 3, 4, 5, or 6 bits
CBG transmission information - 0, 2, 4, 6, or 8 bits
PTRS-DMRS association - 2 bits.
beta_offset indicator - 2 bits
DMRS sequence initialization - 0 or 1 bit
UL/SUL indicator - 0 or 1 bit Fallback DCI for scheduling a PDSCH may include, for example, the following information.

TABLE 5

Identifier for DCI formats-[1] bit
Frequency domain resource assignment-$\lceil \log_2(N_{RB}^{DL,BWP}(N_{RB}^{DL,BWP} + 1)/2) \rceil$ bits
Time domain resource assignment-X bits
VRB-to-PRB mapping-1 bit.
Modulation and coding scheme-[5] bits
New data indicator-1 bit
Redundancy version-[2] bits
HARQ process number-[4] bits
Downlink assignment index-2 bits
TPC command for scheduled PUCCH-[2] bits
PUCCH resource indicator-[2] bits
PDSCH-to-HARQ feedback timing indicator-[3] bits Non-fallback DCI for scheduling a PDSCH may include, for example, the following information.

TABLE 6

Carrier indicator-0 or 3 bits
Identifier for DCI formats-[1] bits
Bandwidth part indicator-0, 1 or 2 bits
Frequency domain resource assignment
For resource allocation type 0, $\lceil N_{RB}^{DL,BWP} :P \rceil$ bits
For resource allocation type 1, $\lceil \log_2(N_{RB}^{DL,BWP}(N_{RB}^{DL,BWP} + 1)/2) \rceil$ bits TABLE 6-continued Time domain resource assignment-1, 2, 3, or 4 bits
VRB-to-PRB mapping-0 or 1 bit, only for resource allocation type 1.
0 bit if only resource allocation type 0 is configured:
1 bit otherwise.
PRB bundling size indicator-1 bit
Rate matching indicator-0, 1, 2 bits
ZP CSI-RS trigger-X bits
For transport block 1:
Modulation and coding scheme-5 bits
New data indicator-1 bit TABLE 6-continued Redundancy version-2 bits
For transport block 2:
Modulation and coding scheme-5 bits
New data indicator-1 bit
Redundancy version-2 bits
HARQ process number-4 bits
Downlink assignment index-0 or 4 bits
TPC command for scheduled PUCCH-2 bits
PUCCH resource indicator
PDSCH-to-HARQ_feedback timing indicator-3 bits
Antenna ports-up to 5 bits
Transmission configuration indication-3 bits
SRS request-2 bits
CBG transmission information-0, 2, 4, 6, or 8 bits
CBG flushing out information-0 or 1 bit
DMRS sequence initialization-0 or 1 bit The DCI may be transmitted through a PDCCH through channel coding and modulation. A CRC is attached to payload of a DCI message and scrambled with an RNTI corresponding to the ID of the UE. Different RNTIs are used according to the purpose of the DCI message, e.g., UE-specific data transmission, a power control command, or a random access response. The RNTI is included in a CRC calculation process and transmitted rather than it is transmitted explicitly. Upon receipt of the DCI message on the PDCCH, the UE identifies the CRC by using an allocated RNTI, and if the CRC check result is correct, the UE may identify that the corresponding message is for the UE.

For example, DCI that schedules a PDSCH for system information (SI) may be scrambled with an SI-RNTI. DCI that schedules a PDSCH for a random access response (RAR) message may be scrambled with an RA-RNTI. DCI that schedules a PDSCH for a paging message may be scrambled with a P-RNTI. DCI that indicates a slot format indicator (SFI) may be scrambled with an SFI-RNTI. DCI that indicates a TPC may be scrambled with a TPC-RNTI. DCI that schedules a UE-specific PDSCH or PUSCH may be scrambled with a cell RNTI (C-RNTI).

When a specific UE is scheduled for a data channel, that is, a PUSCH or PDSCH by a PDCCH, data is transmitted and received together with a DMRS in a scheduled resource region.

Figure 5:
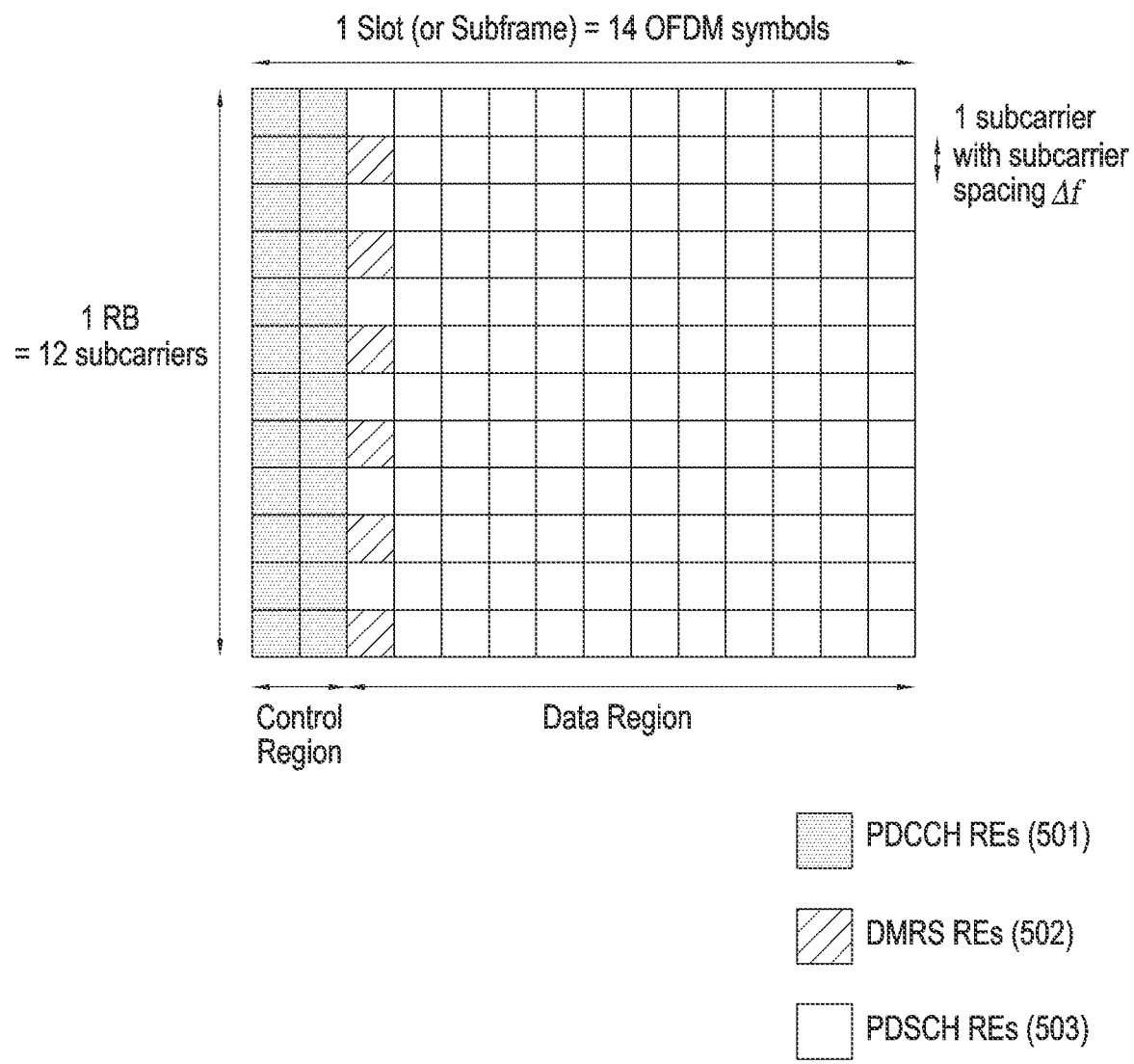
FIG. 5 illustrates an exemplary configuration for a downlink resource block (RB) structure in a 5G system.

FIG. 5 illustrates a case in which a specific UE uses 14 OFDM symbols as one slot (or subframe) on DL, a PDCCH is transmitted in two starting OFDM symbols, and a DMRS is transmitted in the third symbol. In the case of FIG. 5, data is mapped to REs other than REs carrying the DMRS in the third symbol of a specific RB in which a PDSCH is scheduled, and REs in the fourth to last symbols of the RB, and transmitted on the PDSCH. A subcarrier spacing $\Delta f$ represented in FIG. 5 is 15 kHz in the LTE/LTE-A system and one of {15, 30, 60, 120, 240, 480} kHz in the case of 5G system.

To measure a DL channel state in a cellular system, a BS should transmit a reference signal as described above. In the 3GPP LTE-A system, a UE may measure a channel state between a BS and the UE by using a CRS or a CSI-RS transmitted by the BS. The channel state should be measured in consideration of various factors, which may include the amount of interference on DL. The amount of interference on the DL includes an interference signal and thermal noise generated by an antenna belonging to a neighboring BS, and is important for the UE to determine a DL channel state. For example, when a BS with one transmission antenna transmits a signal to a UE with one reception antenna, the UE should determine Es/Io by determining energy per symbol receivable on the DL and the amount of interference to be received simultaneously in a corresponding symbol from a reference signal received from the BS. The determined Es/Io is converted into a data transmission rate or a value corresponding thereto and transmitted in the form of a channel quality indicator (CQI) to the BS, and the BS may use the CQI in determining a data transmission rate for data transmission to the UE.

In the LTE-A system, the UE feeds back information about the DL channel state to the BS so that the BS may use it for DL scheduling. That is, the UE measures the reference signal transmitted by the BS on the DL and feeds back information extracted from the reference signal to the BS in a form defined in the LTE/LTE-A standard. As described above, information fed back by the UE in LTE/LTE-A may be referred to as channel state information, and the channel state information may include the following three pieces of information.

Rank indicator (RI): The number of spatial layers that the UE may receive in the current channel state Precoding matrix indicator (PMI): An indicator for a precoding matrix preferred by the UE in the current channel state Channel quality indicator (CQI): A maximum data rate that the UE may receive in the current channel state The CQI may be replaced with a signal to interference plus noise ratio (SINR) that may be used similarly to the maximum data rate, a maximum error correction code rate and modulation scheme, and data efficiency per frequency.

The RI, PMI, and CQI have a meaning in association with each other. For example, a precoding matrix supported by LTE/LTE-A is defined differently for each rank. Therefore, a PMI value X when the RI has a value of 1 and a PMI value X when the RI has a value of 2 may be interpreted differently. Further, when the UE determines a CQI, the UE assumes that the PMI and X of which the UE has notified the BS are applied by the BS. That is, when the UE reports RI_X, PMI_Y, and CQI_Z to the BS, this amount to reporting that the UE is capable of receiving a data rate corresponding to CQI_Z when the rank is RI_X and the PMI is PMI_Y. In this way, when the UE calculates a CQI, the UE assumes a transmission scheme that the BS will perform, so that optimal performance may be obtained in the case where an actual transmission is performed in the transmission scheme.

In LTE/LTE-A, the UE may feedback channel state information, RI, PMI, and CQI, periodically or aperiodically. When the BS wants to obtain channel state information about a specific UE aperiodically, the BS may configure the UE to perform an aperiodic feedback (or aperiodic channel state information reporting) by using an aperiodic feedback indicator (or a channel state information request field or channel state information request information) included in DCI for the UE. In addition, when the UE receives an indicator set to aperiodic feedback in an $n^{th}$ subframe, the UE may perform UL transmission by including aperiodic feedback information (or channel state information) in data transmission in an $(n+k)^{th}$ subframe. Herein, k is a parameter defined in the 3GPP LTE Release 11 standard, which is 4 in frequency division duplexing (FDD) and may be defined as illustrated in Table 7 in time division duplexing (TDD).

TABLE 7

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

When aperiodic feedback is configured, feedback information (or channel state information) includes an RI, a PMI, and a CQI, and the RI and the PMI may not be fed back according to a feedback configuration (or a channel state report configuration).

Embodiments of the disclosure will be described in detail in conjunction with the accompanying drawings. Although an embodiment of the disclosure is described in the context of the LTE or LTE-A system as an example, the embodiment of the disclosure is also applicable to other communication systems having a similar technical background or channel type. For example, the communication systems may include the $5^{th}$ generation mobile communication technology (5G or new radio (NR)) developed after LTE-A. Therefore, the embodiment of the disclosure may be applied to other communication systems through some modification without greatly departing from the scope of the disclosure, as judged by those skilled in the art.

Further, lest it should obscure the subject matter of the disclosure, a detailed description of a known function or construction will be avoided in describing the disclosure. The terms as described later are defined in consideration of functions in the disclosure, and may be changed according to the intention of a user or an operator, or customs. Therefore, the definitions should be made, not simply by the actual terms used but by the meanings of each term lying within.

The disclosure proposes a method of reducing a peak-to-average power ratio (PAPR) during OFDM-based transmission and reception on DL for wireless communication in a terahertz (THz) band. The disclosure includes a method of defining a plurality of DMRS sequences for DL transmission, designing a corresponding control signal, and selecting an optimal DMRS among a plurality of DMRSs, and a method of defining a plurality of data transformations, designing a corresponding control signal, and selecting an optimal data transformation scheme, performed by a BS. Further, the disclosure includes a method of performing channel estimation and decoding data according to a corresponding DMRS sequence or a corresponding data transformation scheme by a UE.

Figure 6:
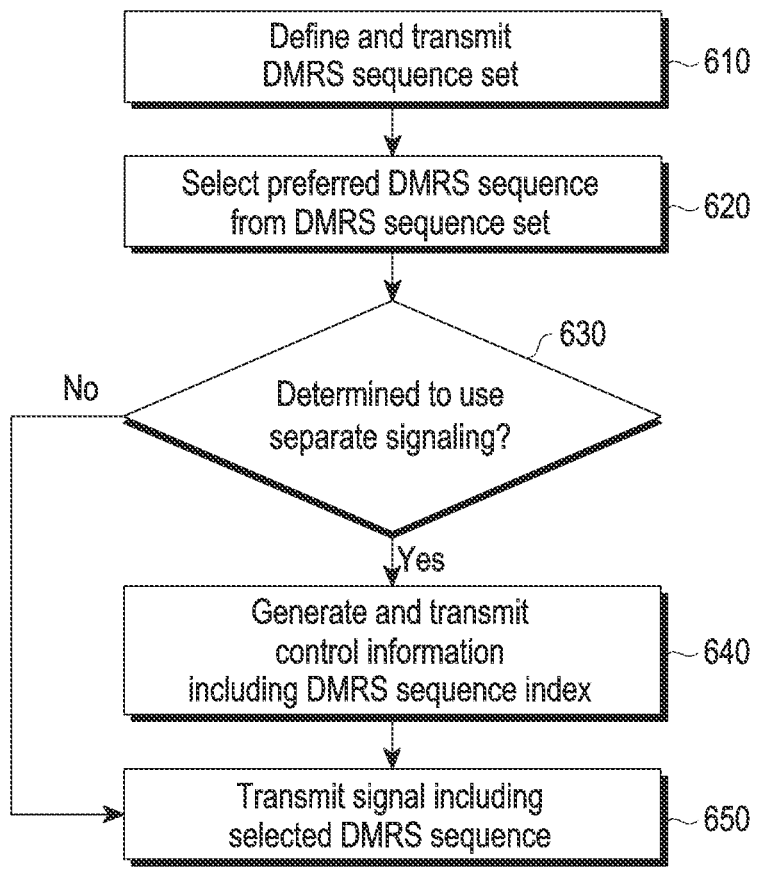
FIG. 6 is a flowchart illustrating an operation of selecting a DMRS sequence according to an embodiment of the disclosure.

FIG. 6 is a flowchart illustrating an operation of selecting a DMRS sequence according to an embodiment of the disclosure. While the operation of the flowchart will be described below as being performed by a BS, a similar operation may also be performed by a UE.

The BS may define a set of available DMRS sequences. The DMRS sequences may be generated using, for example, cyclic shifts of a Zadoff-chu sequence as used when applying discrete Fourier transform (DFT precoding) on NR UL. In another example, a method of generating different DMRS sequences modulated in quadrature phase shift keying (QPSK), while changing an initial value "c_init" applied for generation of a pseudo-random sequence (see 7.4.1.1 of 3GPP TS38.211) may be used as used on NR DL.

The BS may transmit information about the defined set of DMRS sequences to the UE or a BS through RRC signaling or a physical layer channel (610). In an embodiment, a set of DMRS sequences may be predetermined by a standard or a system operator and pre-stored during manufacturing of the BS and the UE. In an embodiment of the disclosure, information about a plurality of DMRS sequences may include information about the number of the plurality of DMRS sequences.

The BS selects a preferred DMRS sequence from the set of DMRS sequences (620). The preferred DMRS sequence may refer to a DMRS sequence applied to a signal having a lowest measured PAPR. An embodiment of selecting a preferred DMRS sequence is given as follows. The BS may multiplex each of the DMRS sequences included in the set of DMRS sequences with a data symbol sequence to be transmitted. Each of the multiplexed signals may include a different DMRS sequence. Inverse discrete Fourier transform (IDFT) may be performed on each of the multiplexed signals. The BS may measure the PAPR values of the IDFT signals and identify a signal having a lowest measured PAPR value. A DMRS sequence included in the signal having the lowest PAPR value may be selected as a preferred DMRS sequence.

The BS may determine to use separate signaling to inform the UE of a DMRS sequence index indicating the selected DMRS sequence (630). In an embodiment, the BS may generate control information including the DMRS sequence index indicating the selected DMRS sequence, and transmit the control information to the UE through a physical layer channel (e.g., a PDCCH) (640). In another embodiment, the control information may be transmitted to the UE through RRC signaling. Subsequently, the BS may transmit the IDFT signal (i.e., the signal having the lowest PAPR value) including the selected DMRS sequence to the UE (650).

In operation 630, the BS may determine not to use separate signaling to transmit the DMRS sequence index indicating the selected DMRS sequence to the UE. In this case, the IDFT signal including the selected DMRS sequence may be transmitted to the UE without the control information (650). The UE may identify the selected DMRS sequence through blind detection.

In an embodiment, the BS may determine whether to transmit the DMRS sequence index through separate signaling in the following method in operation 630. When transmitting a data symbol sequence including PDCCH information bits, the BS may omit separate signaling indicating a DMRS sequence index. When transmitting a data symbol sequence including PDSCH information bits, the BS may inform the UE of a DMRS sequence index selected for the data symbol sequence through DCI on a PDCCH related to a PDSCH.

Figure 7:
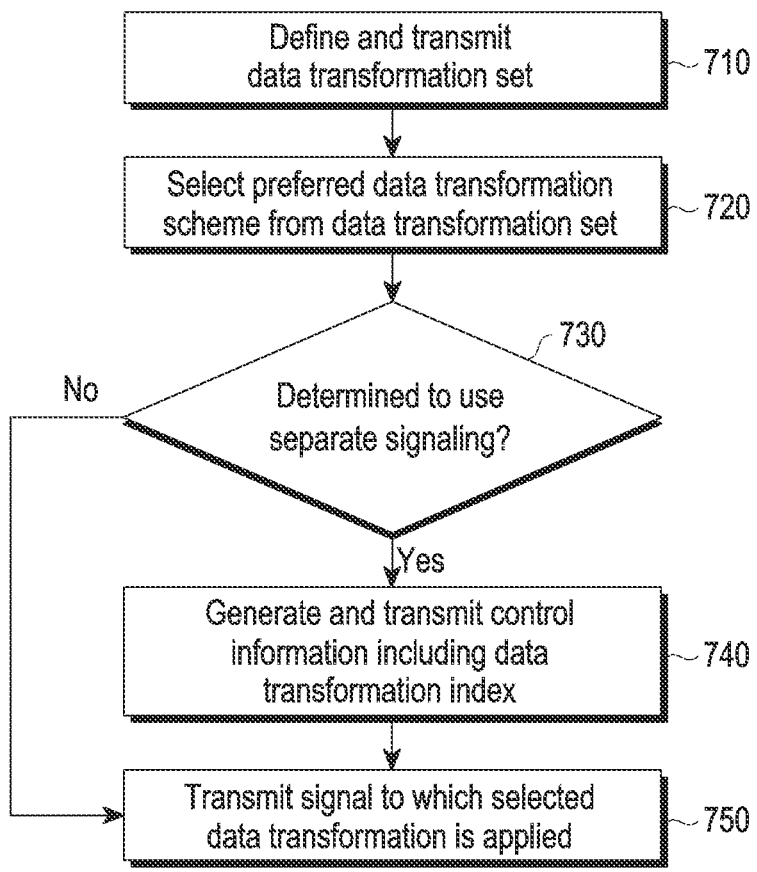
FIG. 7 is a flowchart illustrating an operation of selecting a data transformation scheme according to an embodiment of the disclosure.

FIG. 7 is a flowchart illustrating an operation of selecting a data transformation scheme according to an embodiment of the disclosure. While the operation of the flowchart will be described below as being performed by a BS, a similar operation may also be performed by a UE.

The BS may define a set of available data transformation schemes. Each data transformation scheme may refer to a reversible transform scheme with a one-to-one correspondence with a data vector s[n] to be transmitted to the UE. For example, $f_1(s[n])$, $f_2(s[n])$ ..., $f_U(s[n])$ denotes U different data transformation schemes, and $f_1, f_2, \ldots f_U$ are reversible and satisfy a one-to-one correspondence. A set of a plurality of such data transformation schemes ($f_2, f_2, \ldots, f_U$) may be defined as a data transformation set. In an embodiment, the data transformation schemes may include interleaving for changing the order of a data vector, multiplying a data vector by a specific sequence (e.g., a Hadamard sequence) (e.g. referred to as Hadamard transform or sequence multiplication), and both interleaving and sequence multiplication. The BS may transmit information about the defined data transformation set to the UE through RRC signaling or a physical layer channel (e.g., PDCCH DCI) (710). In an embodiment of the disclosure, the information about the data transformation set including a plurality of data transformation schemes may include information about the number of the plurality of DMRS sequences. According to an embodiment, a data transformation set may be pre-stored during manufacturing of the BS and the UE according to a standard or a system operator. The BS and the UE may be synchronized for the same data transformation set through the above methods.

The BS may select a preferred data transformation scheme from the data transformation set. The preferred data transformation scheme may refer to a data transformation scheme that may minimize a PAPR. An embodiment of selecting a preferred data transformation is given as follows. The BS may transform a data symbol sequence based on the data transformation schemes included in the data transformation set. In an embodiment of a data transformation scheme, the BS may interleave a data symbol sequence to be transmitted. In an embodiment, a data symbol sequence may be transformed through data transformation based on multiplying a specific sequence (i.e., sequence multiplication). In an embodiment, a data symbol sequence may be transformed through both interleaving and sequence multiplication. The sequence multiplication may be performed using a sequence multiplication matrix including a specific sequence. The data transformation scheme including both interleaving and sequence multiplication may be performed using both a permutation matrix for interleaving and a sequence multiplication matrix or a combination matrix thereof.

The transformed data symbol sequence may be subjected to IDFT. The BS may measure the PAPR values of a plurality of IDFT signals to which the plurality of different data transformation schemes have been applied, and identify a signal having a lowest measured PAPR value. A data transformation scheme applied to the signal having the lowest PAPR value may be selected as a preferred data transformation scheme (720).

The BS may determine to use separate signaling to inform the UE of a data transformation index indicating the selected data transformation scheme (730). In an embodiment, the BS may generate control information including the data transformation index indicating the selected data transformation scheme and transmit the control information through a physical layer channel (e.g., PDCCH DCI) (740). In another embodiment, the control information may be transmitted through RRC signaling. Subsequently, the BS may transmit the IDFT signal (i.e., the signal having the lowest PAPR value) to which the selected data transformation scheme has been applied (750).

In another embodiment, the BS may determine not to inform the UE of the data transformation index indicating the selected data transformation scheme through separate signaling in operation 730. The IDFT signal to which the selected data transformation scheme has been applied may be transmitted to the UE without the control information including the data transformation index (750). In this case, the UE performs blind detection to identify the data transformation scheme applied to the received signal.

Figure 8:
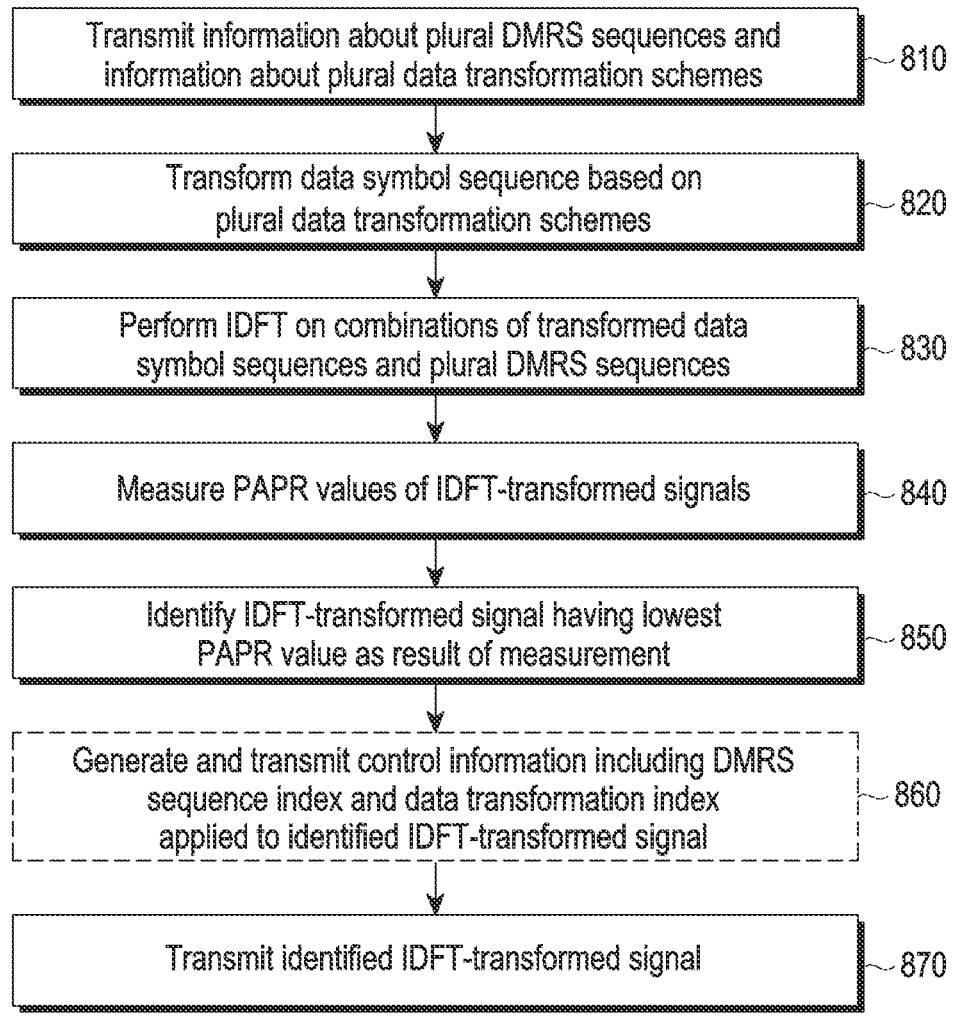
FIG. 8 is a flowchart illustrating an operation of selecting a DMRS sequence and a data transformation scheme according to an embodiment of the disclosure.

FIG. 8 is a flowchart illustrating an operation of selecting a DMRS sequence and a data transformation scheme according to an embodiment of the disclosure. While the operation of the flowchart will be described below as being performed by a BS, a similar operation may also be performed by a UE.

The BS may define a DMRS sequence set including available DMRS sequences and a data transformation set including data transformation schemes. The DMRS sequences may be generated in a similar manner to those described with reference to FIG. 6. The data transformation schemes may be determined in a similar manner to those described with reference to FIG. 7. The BS may transmit information about a plurality of defined DMRS sequences and information about a plurality of defined data transformation schemes to the UE through RRC signaling or a physical layer channel (810). In an embodiment of the disclosure, the information about the plurality of DMRS sequences may include information about the number of the plurality of DMRS sequences, and the information about the plurality of data transformation schemes may include information about the number of the plurality of data transformation schemes. In another embodiment, a plurality of DMRS sequences and a plurality of data transformation schemes may be predetermined by a standard or a system operator and pre-stored during manufacturing of the BS or the UE. The plurality of DMRS sequences may be configured to correspond one-to-one to the plurality of data transformation schemes. For example, a $U^{th}$ DMRS sequence may be linked one-to-one to a $U^{th}$ data transformation scheme. In this case, when the $U^{th}$ data transformation scheme is applied as the data transformation scheme, the $U^{th}$ DMRS sequence may be used in a DMRS sequence combination.

The BS may select a preferred DMRS sequence and a preferred data transformation scheme among the plurality of DMRS sequences and the plurality of data transformation schemes. The DMRS sequence and data transformation scheme preferred by the BS may be a DMRS sequence and data transformation scheme that may minimize a PAPR. An embodiment of selecting a preferred DMRS sequence and a preferred data transformation scheme is given as follows. The BS may transform a data symbol sequence to be transmitted based on the plurality of data transformation schemes (820). Each data transformation scheme for transforming the data symbol sequence may be similar to that described with reference to FIG. 7. According to an embodiment, the data transformation scheme may include interleaving, sequence multiplication, or both interleaving and sequence multiplication. In an embodiment, the interleaving may be performed using a permutation matrix for interleaving. The sequence multiplication may be performed using a sequence multiplication matrix including a specific sequence. A data transformation scheme including both interleaving and sequence multiplication may be performed using both a permutation matrix for interleaving and a sequence multiplication matrix, or a combination matrix.

The BS may generate multiplexed signals by multiplexing a plurality of data symbol sequences transformed using the plurality of data transformation schemes with the plurality of DMRS sequences, respectively, and perform IDFT on the multiplexed signals, respectively (830).

The BS may measure the PAPR value of each of a plurality of IDFT signals (840), and identify an IDFT signal having a lowest PAPR value according to the measurement result (850).

The BS may transmit the identified IDFT signal to the UE (870).

Before transmitting the identified IDFT signal (870), the BS may select the data transformation scheme and the DMRS sequence applied to the identified IDFT signal, and generate control information including a data transformation index indicating the selected data transformation scheme and information about a DMRS sequence index indicating the selected DMRS sequence. In an operation that may be selectively performed, the control information may be transmitted, when the BS determines to transmit it to the UE through separate signaling (860). In an embodiment, the control information may be transmitted through RRC signaling or a physical layer channel (e.g., a PDCCH). In an embodiment, the control information may be transmitted, including a scheduling result related to data symbol sequences.

In an embodiment, in operation 860, whether to transmit the control information including the DMRS sequence index and the data transformation index through separate signaling may be determined in the following method. When transmitting a data symbol sequence including PDCCH information bits, the BS may omit separate signaling indicating a DMRS sequence index and a data transformation index. When transmitting the data symbol sequence including the PDSCH information bits, the BS may inform the UE of the selected DMRS sequence index and the selected data transformation index for the data symbol sequence through DCI on a PDCCH related to a PDSCH.

In the embodiments of FIGS. 6 to 8, the BS may identify a signal with a lowest PAPR and use the signal for communication, thereby reducing resource waste and interference and thus enabling communication with a certain quality guaranteed.

Figure 9:
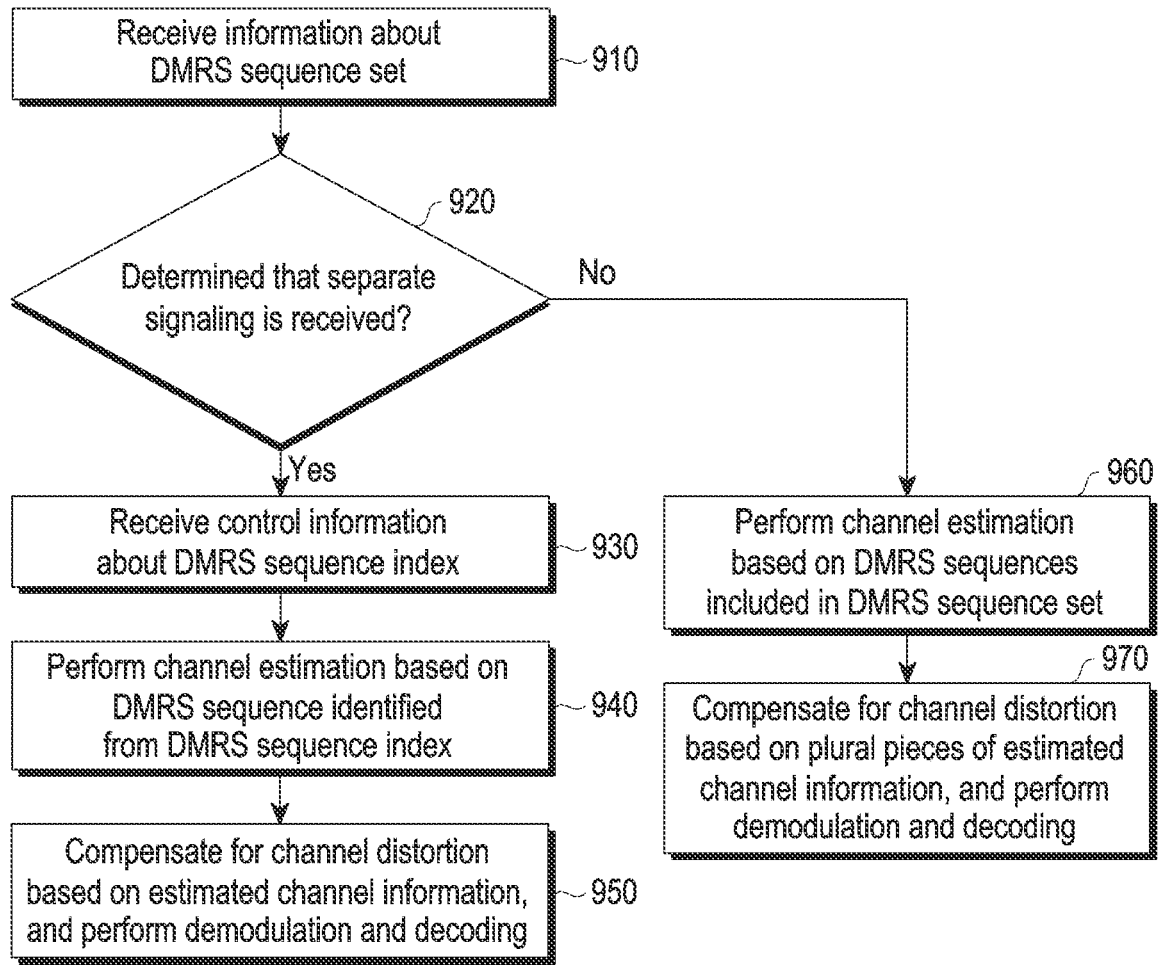
FIG. 9 is a flowchart illustrating an operation of receiving a signal including a selected DMRS sequence according to an embodiment of the disclosure.

FIG. 9 is a flowchart illustrating an operation of receiving a signal including a selected DMRS sequence according to an embodiment of the disclosure. While the operation of the flowchart will be described below as being performed by a UE, a similar operation may also be performed by a BS.

The UE may receive information about a DMRS sequence set including available DMRS sequences from the BS through RRC signaling or a physical layer channel. In an embodiment, a DMRS sequence set may be predetermined by a standard or a system operator and pre-stored during manufacturing of the UE and the BS. The UE may identify the available DMRS sequences from the received information about the DMRS sequence set (910).

The UE may determine whether control information including a DMRS sequence index indicating a DMRS sequence selected by the BS has been received through separate signaling (920). When determining that the separate signaling has been received, the UE may receive the control information (930). In an embodiment, the control information may be received through a physical layer channel (e.g., a PDCCH) or RRC signaling.

The UE may identify the DMRS sequence by the DMRS sequence index included in the received control information.

The UE may perform channel estimation on the signal received from the BS based on the identified DMRS sequence (940).

Subsequently, the UE may compensate for channel distortion of the received signal by using channel information estimated as a result of the channel estimation, and demodulate and decode the compensated signal (950).

In operation 920, the UE may determine that the control information including the DMRS sequence index indicating the DMRS sequence selected by the BS has not been received through separate signaling. In this case, the UE may perform channel estimation on the signal received from the BS using each of the plurality of DMRS sequences included in the DMRS sequence set (960), and compensate for the channel distortion of the received signal by using channel information estimated as a result of channel estimation and demodulate and decode each of the distortion-compensated signals (970). The UE may obtain data bits from a decoding result with a successful CRC among decoding results.

Figure 10:
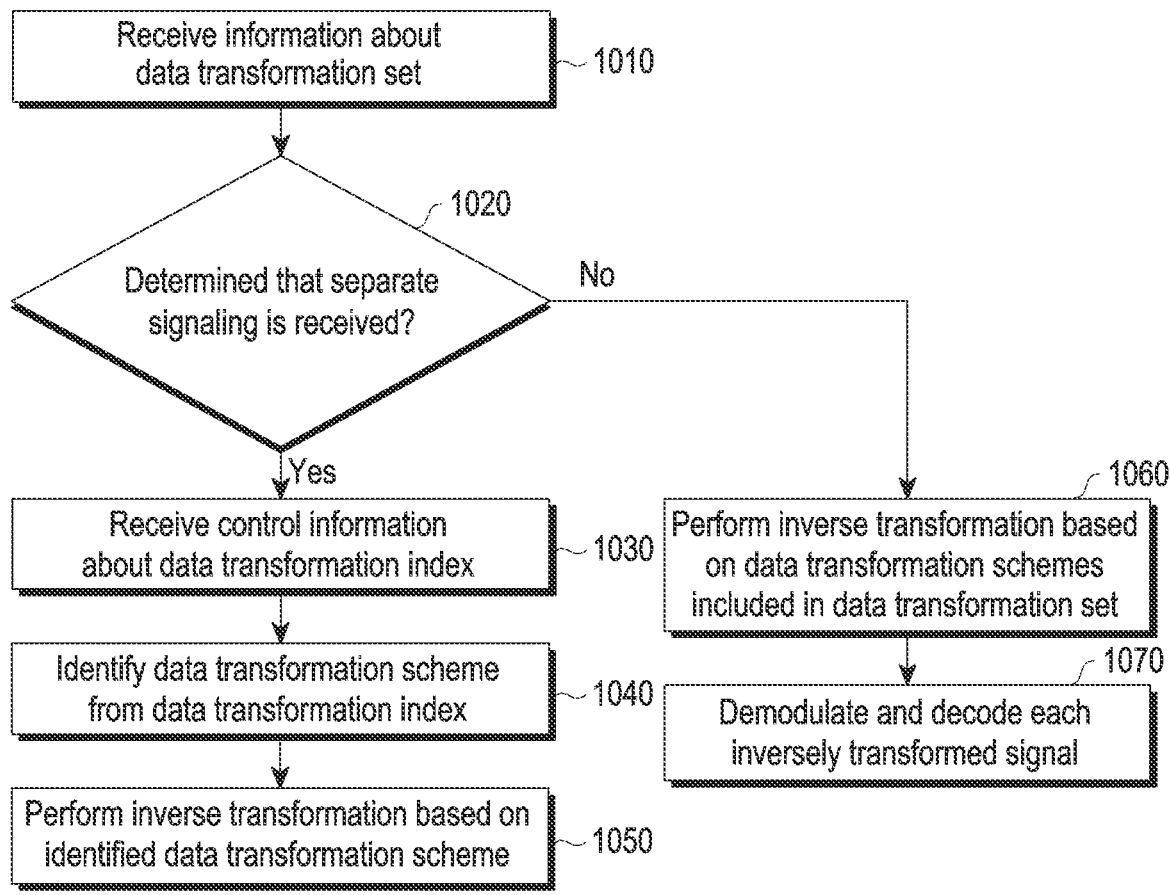
FIG. 10 is a flowchart illustrating an operation of receiving a signal to which a selected data transformation scheme is applied according to an embodiment of the disclosure.

FIG. 10 is a flowchart illustrating an operation of receiving a signal to which a selected data transformation scheme is applied according to an embodiment of the disclosure. While the operation of the flowchart will be described below as being performed by a UE, a similar operation may also be performed by a BS.

The UE may receive information about a data transformation set including available data transformation schemes from the BS through RRC signaling or a physical layer channel (1010). The data transformation set may be pre-stored according to a standard or a system operator during manufacturing of the UE and the BS. The UE and the BS may be synchronized for the same data transformation set through the above methods.

The UE may determine whether control information including a data transformation index indicating a data transformation scheme selected by the BS has been received through separate signaling (1020). When determining that the separate signaling has been received, the UE may receive the control information. In an embodiment, the UE may receive the control information through a physical layer channel (e.g., PDCCH). In another embodiment, the control information may be received through RRC signaling.

The UE may identify the data transformation scheme by the data transformation index included in the received control information (1040).

The UE may inversely transform a data signal included in the signal received from the BS based on the identified data transformation scheme (1050). The inverse transform operation may include sequence multiplication and/or deinterleaving corresponding to interleaving and/or sequence multiplication of the identified data transformation scheme. The UE may restore data bits by demodulating and decoding the inversely transformed signal.

In operation 1020, the UE may determine that the control information including the data transformation index indicating the data transformation scheme selected by the BS has not been received through separate signaling. In this case, the UE may inversely transform a data signal included in the signal received from the BS by using each of the plurality of data transformation schemes included in the data transformation set (1060). In an embodiment, the inverse transformation may be performed using a permutation matrix for deinterleaving corresponding to interleaving performed by the BS. In an embodiment, the inverse transformation may be performed using an inverse matrix corresponding to a sequence multiplication matrix applied by the BS. When a data transformation scheme including both interleaving and sequence multiplication is used, the inverse transformation may be performed using both a permutation matrix for deinterleaving and an inverse matrix of sequence multiplication, or a combination matrix thereof.

The UE may demodulate and decode each of the inversely transformed signals (1070). The UE may obtain data bits from a decoding result with a successful CRC among decoding results.

FIG. 10 is a flowchart illustrating an operation of receiving a signal to which a selected data transformation scheme is applied according to an embodiment of the disclosure. While the operation of the flowchart will be described below as being performed by a UE, a similar operation may also be performed by a BS.

The UE may receive information about a data transformation set including available data transformation schemes from the BS through RRC signaling or a physical layer channel (1010). The data transformation set may be pre-stored according to a standard or a system operator during manufacturing of the UE and the BS. The UE and the BS may be synchronized for the same data transformation set through the above methods.

The UE may determine whether control information including a data transformation index indicating a data transformation scheme selected by the BS has been received through separate signaling (1020). When determining that the separate signaling has been received, the UE may receive the control information. In an embodiment, the UE may receive the control information through a physical layer channel (e.g., PDCCH). In another embodiment, the control information may be received through RRC signaling.

The UE may identify the data transformation scheme by the data transformation index included in the received control information (1040).

The UE may inversely transform a data signal included in the signal received from the BS based on the identified data transformation scheme (1050). The inverse transform operation may include sequence multiplication and/or deinterleaving corresponding to interleaving and/or sequence multiplication of the identified data transformation scheme. The UE may restore data bits by demodulating and decoding the inversely transformed signal.

In operation 1020, the UE may determine that the control information including the data transformation index indicating the data transformation scheme selected by the BS has not been received through separate signaling. In this case, the UE may inversely transform a data signal included in the signal received from the BS by using each of the plurality of data transformation schemes included in the data transformation set (1060). In an embodiment, the inverse transformation may be performed using a permutation matrix for deinterleaving corresponding to interleaving performed by the BS. In an embodiment, the inverse transformation may be performed using an inverse matrix corresponding to a sequence multiplication matrix applied by the BS. When a data transformation scheme including both interleaving and sequence multiplication is used, the inverse transformation may be performed using both a permutation matrix for deinterleaving and an inverse matrix of sequence multiplication, or a combination matrix thereof.

The UE may demodulate and decode each of the inversely transformed signals (1070). The UE may obtain data bits from a decoding result with a successful CRC among decoding results.

Figure 11:
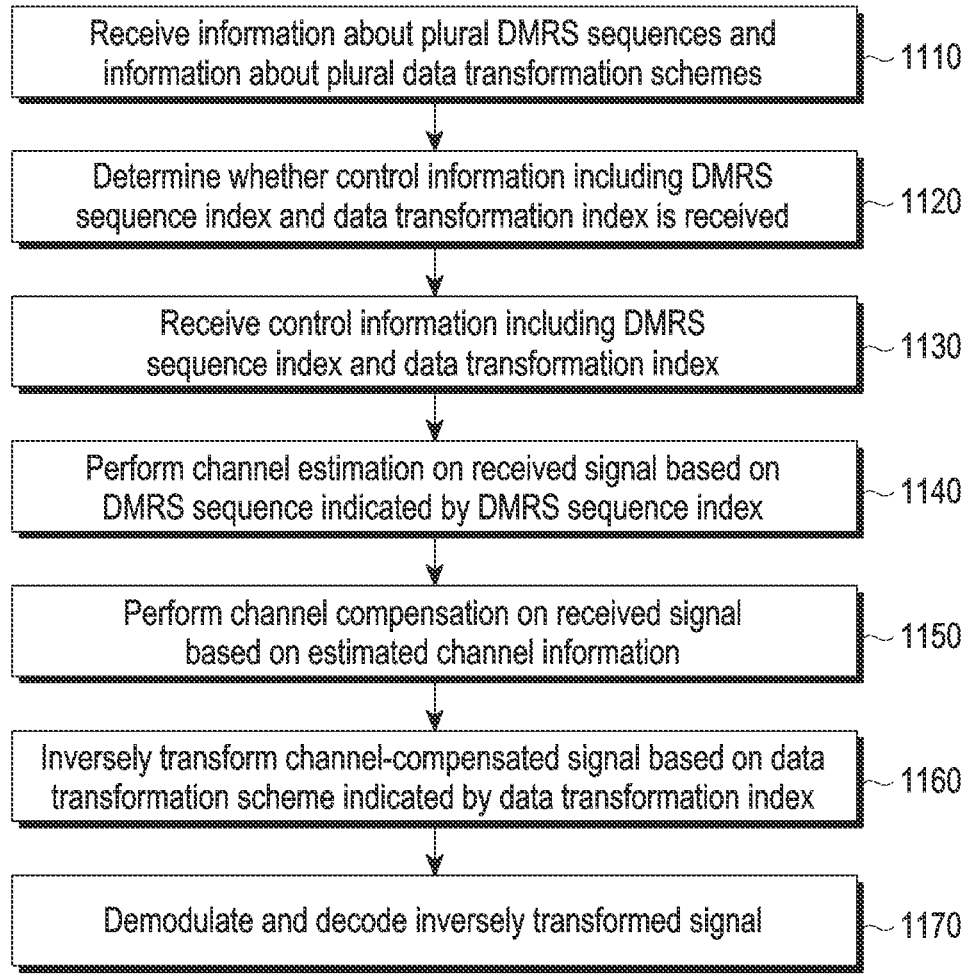
FIG. 11 is a flowchart illustrating an operation of receiving a signal to which a selected DMRS sequence and data transformation scheme are applied according to an embodiment of the disclosure.

FIG. 11 is a flowchart illustrating an operation of receiving a signal to which a selected DMRS sequence and data transformation scheme are applied according to an embodiment of the disclosure. While the operation of the flowchart will be described below as being performed by a UE, a similar operation may also be performed by a BS.

The UE may receive information about a plurality of DMRS sequences and information about a plurality of data transformation schemes from the BS (1110). The DMRS sequences may be generated in a similar manner to those described with reference to FIG. 6. The data transformation schemes may be determined in a similar manner to those described with reference to FIG. 7. In an embodiment, the information about the plurality of DMRS sequences and the information about the plurality of data transformation schemes may be received through RRC signaling or a physical layer channel. In an embodiment, the information about the plurality of DMRS sequences may include information about the number of the plurality of DMRS sequences, and the information about the plurality of data transformation schemes may include information about the number of the plurality of data transformation schemes. In an embodiment, the plurality of DMRS sequences and the plurality of data transformation schemes may be predetermined by a standard or a system operator and pre-stored during manufacturing the UE or the BS.

In an embodiment, the UE may determine whether control information including information about a DMRS sequence index indicating one DMRS sequence among the plurality of DMRS sequences and information about a data transformation index indicating one data transformation scheme among the plurality of data transformation schemes has been received from the BS through separate signaling (1120). When determining that the separate signaling has been used, the UE may receive the control information (1130). The control information may include a scheduling result related to data symbol sequences and be received through a physical layer channel or RRC signaling.

The UE may identify the DMRS sequence and data transformation scheme selected by the BS through the DMRS sequence index and data transformation index included in the received control information.

The UE may perform channel estimation on the signal received from the BS based on the identified DMRS sequence (1140). The UE may compensate for channel distortion of the received signal by using channel information estimated as a result of the channel estimation (1150).

The UE may inversely transform a data signal included in the compensated signal based on the identified data transformation scheme (1160). The inverse transformation operation may include sequence multiplication and/or deinterleaving corresponding to interleaving and/or sequence multiplication of the identified data transformation scheme. In an embodiment, the inverse transformation may be performed using a permutation matrix for deinterleaving corresponding to interleaving performed by the BS. In an embodiment, the inverse transformation may be performed using an inverse matrix corresponding to a sequence multiplication matrix applied by the BS. When a data transformation scheme including both interleaving and sequence multiplication is used, the inverse transformation may be performed using both a permutation matrix for deinterleaving and an inverse matrix of sequence multiplication, or a combination matrix thereof. The UE may obtain data bits by demodulating and decoding the inversely transformed signal (1170).

In operation 1120, the UE may determine that the control including information including the DMRS sequence index indicating one of the plurality of DMRS sequences and the data transformation index indicating one of the plurality of data transformation schemes has not been received through separate signaling from the BS. In this case, the UE may perform channel estimation on the signal received from the BS based on the plurality of DMRS sequences obtained through the information received in operation 1110, and compensate for channel distortion in the received signal by using each piece of channel information estimated as a result of the channel estimation.

The UE may perform inverse transformation on each of the compensated signals based on the plurality of data transformation schemes obtained through the information received in operation 1110. In an embodiment, the plurality of DMRS sequences may be configured to correspond one-to-one to the plurality of data transformation schemes. For example, a $U^{th}$ DMRS sequence may be linked one-to-one to a $U^{th}$ data transformation scheme. In this case, when the $U^{th}$ data transformation scheme is applied as the data transformation scheme, the $U^{th}$ DMRS sequence may be used. In this case, the UE may apply a data transformation scheme corresponding to a specific DMRS sequence to one compensated signal related to the specific DMRS sequence. In another embodiment, the UE may apply each of the plurality of data transformation schemes to one compensated signal related to a specific DMRS sequence.

The inverse transformation operation may include sequence multiplication and/or deinterleaving corresponding to interleaving and/or sequence multiplication of each data transformation scheme. In an embodiment, the inverse transformation may be performed using a permutation matrix for deinterleaving corresponding to interleaving performed by the BS. In an embodiment, the inverse transformation may be performed using an inverse matrix corresponding to a sequence multiplication matrix applied by the BS. When a data transformation scheme including both interleaving and sequence multiplication is used, the inverse transformation may be performed using both a permutation matrix for deinterleaving and an inverse matrix of sequence multiplication, or a combination matrix thereof.

The UE may demodulate and decode the inversely transformed signals. The UE may obtain data bits from a decoding result with a successful CRC among decoding results.

Figure 12:
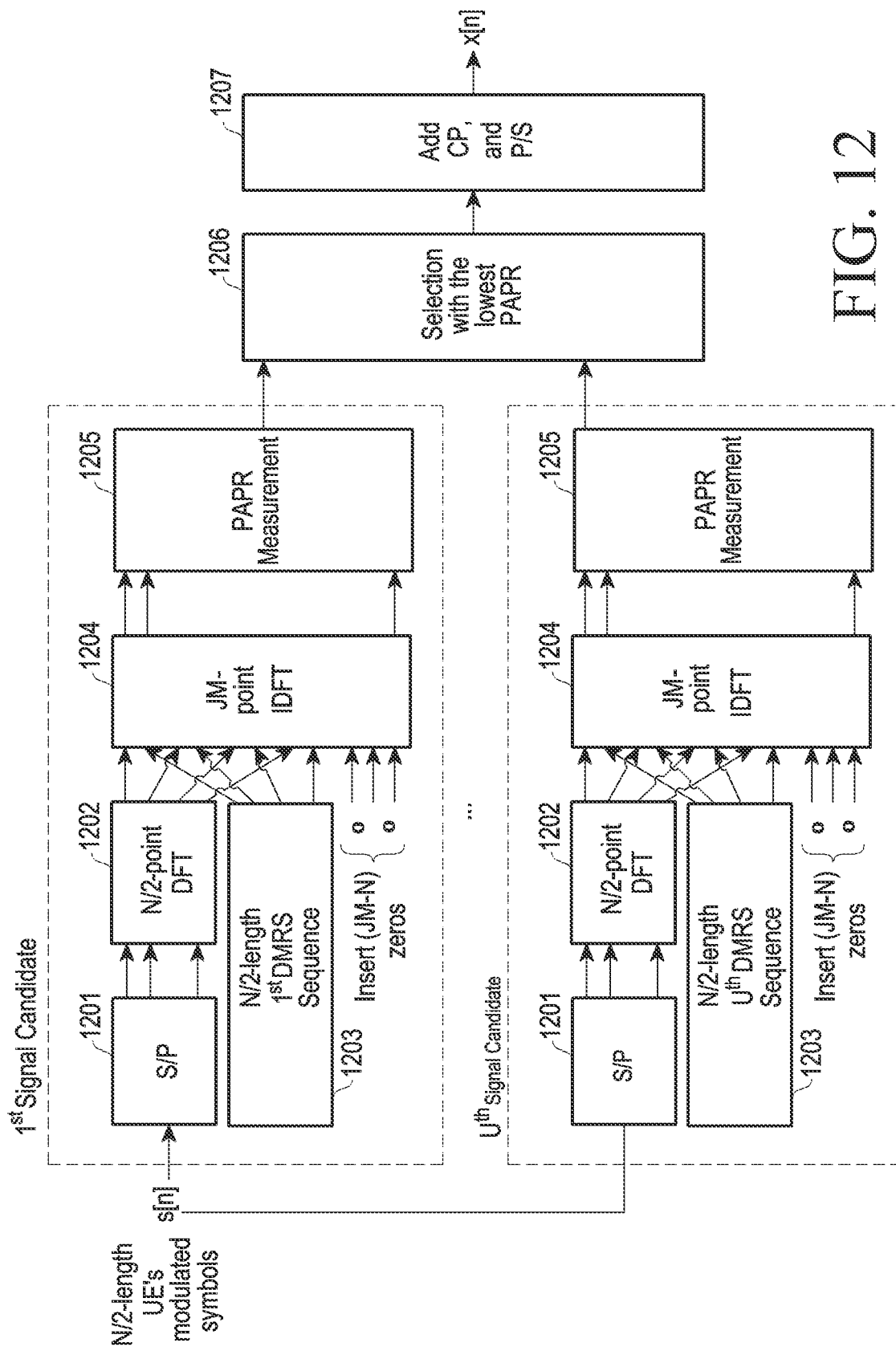
FIG. 12 is a block diagram illustrating a transmitter for selecting a DMRS sequence according to an embodiment of the disclosure.

FIG. 12 is a block diagram illustrating a transmitter for selecting a DMRS sequence according to an embodiment of the disclosure. The transmitter may be a transmitter of a BS or a UE. While operations will be described as being performed by the transmitter, they may be described as being performed by the transmitter under the control of a processor.

FIG. 12 illustrates a specific embodiment of the embodiment of FIG. 6, which is equally applicable to existing OFDM and single carrier systems.

A data symbol sequence s[n] generated by a data modulator (not shown) may pass through a serial-to-parallel (S/P) converter 1201. The length of the data symbol sequence s[n] is N/2 (i.e., n=1, 2, . . . , N/2). DFT-precoding may be performed on the data symbol sequence which has passed through the S/P converter 1201 by an N/2-point DFT 1202.

The transmitter may define a DMRS sequence set 1203 including a plurality of different DMRS sequences. The number of the different DMRS sequences included in the DMRS sequence set is U, and their length is N/2. If the U different DMRS sequences are input to a JM-point IDFT 1204, U different candidate signals may be generated by IDFT. The different DMRS sequences 1203 may be generated using, for example, cyclic shifts of a Zadoff-chu sequence as used when DFT (DFT precoding) is applied on NR UL. In another example, a method of generating different DMRS sequences modulated in QPSK, while changing an initial value "c_init" applied for generation of a pseudo-random sequence (see 7.4.1.1 of 3GPP TS38.211) may be used as used on NR DL. Information about the DMRS sequence set 1203 may be preliminarily transmitted to the UE through RRC signaling or a physical layer channel. In an embodiment, the DMRS sequence set may be predetermined by a standard or a system operator and pre-stored during manufacturing of the BS and the UE.

A DFT-precoded N/2-length data symbol sequence and an N/2-length DMRS sequence may be multiplexed in the frequency domain (i.e., frequency division multiplexing (FDM)) before the IDFT 1204. When FDM is performed, data symbols of the DFT data symbol sequence and DMRS symbols of the DMRS sequence may be alternately mapped to input taps of the IDFT 1204. For example, the data symbols may be mapped to taps corresponding to a $1^{st}$ subcarrier, a $3^{rd}$ subcarrier, a $5^{th}$ subcarrier . . . among the input taps of the IDFT 1204, and the DMRS symbols may be mapped to taps corresponding to a $2^{nd}$ subcarrier, a $4^{th}$ subcarrier, a $6^{th}$ subcarrier . . . among the input taps of the IDFT 1204. Further, JM-N input taps are zero-padded, for oversampling, and thus the data symbols, the DMRS symbols, and zero symbols may be mapped to the input taps of the JM-point IDFT 1204.

PAPR measurers 1205 measure PAPR values of time-domain JM-length signals on which IDFT has been performed. A total of U different candidate signals may be generated and the PAPR value of each candidate signal may be measured, by repeating the above processes in the devices 1201, 1202, 1203, 1204, and 1205 based on each DMRS sequence included in the DMRS sequence set. A signal selector 1206 may identify a signal having a lowest PAPR among them. For example, when a $U^{th}$ candidate signal has the lowest PAPR, the $U^{th}$ candidate signal may be identified. Subsequently, a CP adder 1207 adds a cyclic prefix (CP) to the signal having the lowest PAPR (herein, a $U^{th}$ signal multiplexed with a $U^{th}$ DMRS sequence), serializes the CP-added signal, and transmits the serialized signal.

In an embodiment, a DMRS sequence index indicating the DMRS sequence applied to the signal selected by the signal selector 1206 may be transmitted to the UE through a physical layer channel or RRC signaling.

Figure 13:
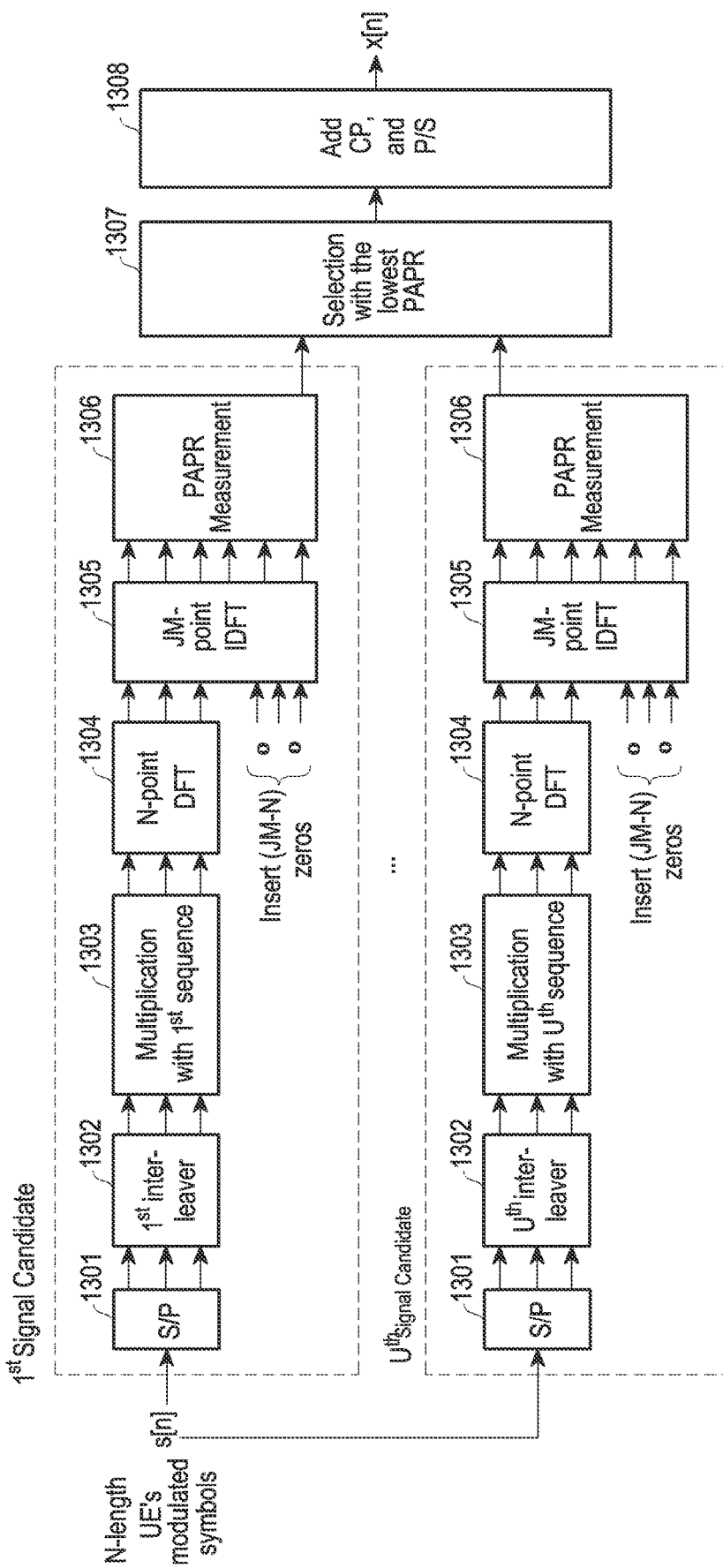
FIG. 13 is a block diagram illustrating a transmitter for selecting a data transformation scheme according to an embodiment of the disclosure.

FIG. 13 is a block diagram illustrating a transmitter for selecting a data transformation scheme according to an embodiment of the disclosure. The transmitter may be a transmitter of a BS or a UE. While operations will be described as being performed by the transmitter, they may be described as being performed by the transmitter under the control of a processor.

A data symbol sequence s[n] generated by a data modulator (not shown) may pass through an S/P converter 1301. The length of the data symbol sequence s[n] is N. The transmitter may define a plurality of different data transformation schemes. The number of different data transformation schemes included in a data transformation set is U. Each of the different data transformation schemes may be applied to the data symbol sequence. Accordingly, different candidate signals may be determined. The data transformation schemes may be determined in a similar manner to those described with reference to FIG. 7.

To apply the data transformation scheme, the data symbol sequence output from the S/P converter 1301 may be input to an interleaver 1302. A used interleaving method may be implemented using a random N×N permutation matrix. The used random permutation matrix may be a matrix (interleaving matrix) in which each element is 0 or 1, and the sum of each row and the sum of each column are 1.

The interleaved N-length data symbol sequence may be multiplied by a predetermined N-length sequence in a sequence multiplication processor 1303 (sequence multiplication or Hadamard transform). U different sequences which are multiplied may be orthogonal to each other. For example, U predetermined different sequences may be configured by selecting U rows from among the rows of an N×N Hadamard matrix.

The data symbol sequence which has passed through the sequence multiplication processor 1303 may be DFT-precoded by an N-point DFT 1304. The DFT-precoded N-length data symbol sequence may be mapped to input taps of an IDFT 1305. Further, JM-N input taps of the IDFT 1305 may be zero-padded, for oversampling, and thus the data symbols and zero symbols may be mapped to the input taps of the JM-point IDFT 1305.

PAPR measurers 1306 measure the PAPR values of time-domain JM-length signals on which IDFT has been performed. A total of U different candidate signals may be generated and the PAPR value of each candidate signal may be measured, by repeating the above processes in the devices 1301, 1302, 1303, 1304, 1305, and 1306 based on U data transformation schemes included in the data transformation set. A signal selector 1307 may identify a signal having a lowest PAPR among them. For example, when a $U^{th}$ candidate signal has the lowest PAPR, the $U^{th}$ candidate signal may be identified. Subsequently, a CP adder 1308 adds a CP to the signal having the lowest PAPR (herein, a $U^{th}$ signal to which a $U^{th}$ data transformation scheme is applied), serializes the CP-added signal, and transmits the serialized signal.

In an embodiment, a data transformation index indicating the data transformation scheme applied to the signal selected by the signal selector 1307 may be transmitted to the UE through a physical layer channel or RRC signaling.

Figure 14:
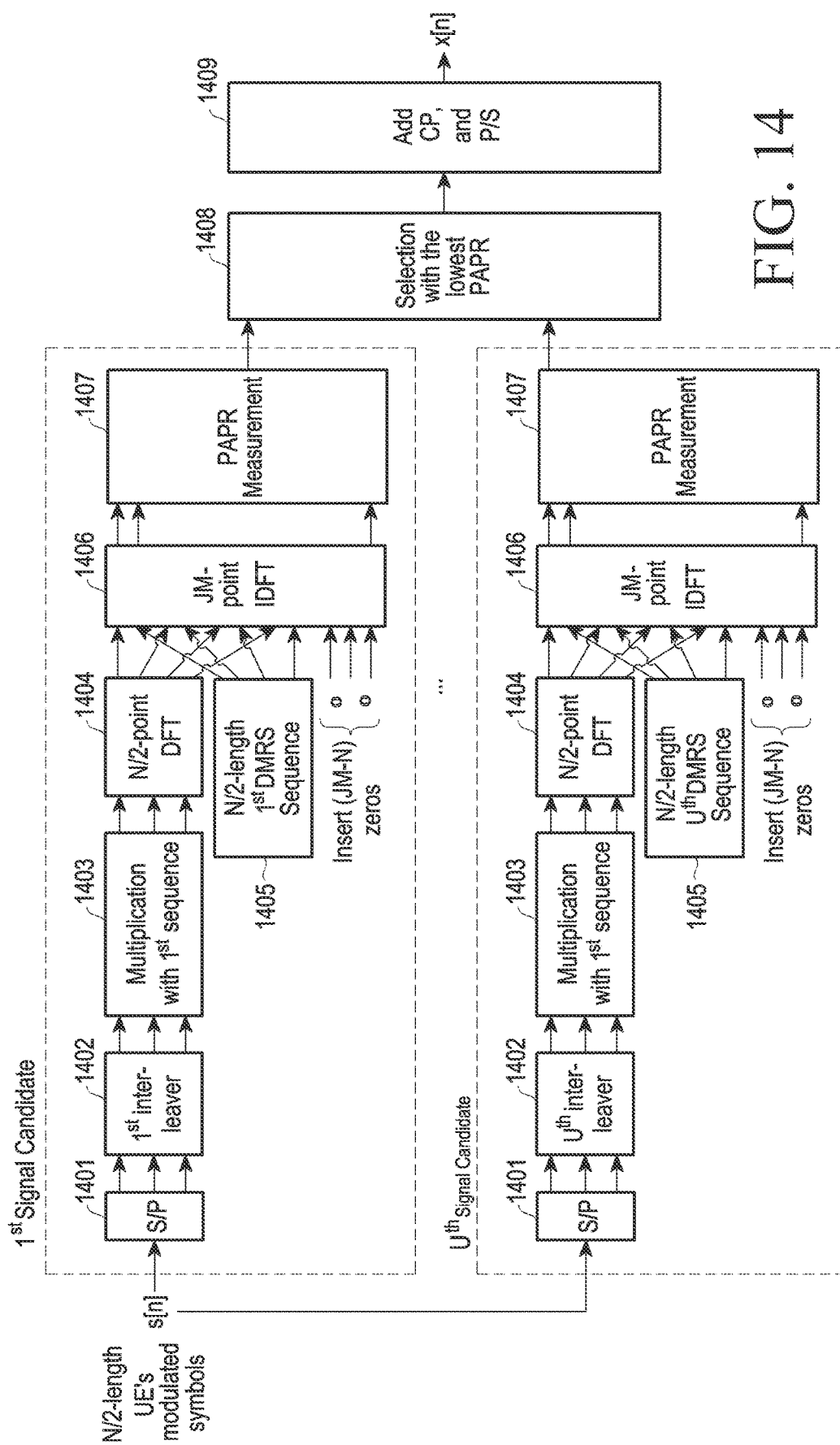
FIG. 14 is a block diagram illustrating a transmitter for selecting a DMRS sequence and a data transformation scheme according to an embodiment of the disclosure.

FIG. 14 is a block diagram illustrating a transmitter for selecting a DMRS sequence and a data transformation scheme according to an embodiment of the disclosure. The transmitter may be a transmitter of a BS or a UE. While operations will be described as being performed by the transmitter, they may be described as being performed by the transmitter under the control of a processor.

FIG. 14 illustrates a specific embodiment of the embodiment of FIG. 8, which is equally applicable to existing OFDM and single carrier systems.

Most components of FIG. 14 are similar to the block diagram of FIG. 12, and interleavers 1402 and sequence multiplication processors 1403 for applying data transformation schemes are added as illustrated in FIG. 13. Accordingly, the components of FIG. 14 may be similar to those described with reference to FIGS. 12 and 13.

A data symbol sequence s[n] generated by a data modulator (not shown) may pass through an S/P converter 1401. The length of the data symbol sequence s[n] is N/2. The transmitter may define a plurality of different data transformation schemes. The number of the different data transformation schemes is U. Each of the different data transformation schemes may be applied to a data symbol sequence. Accordingly, different candidate signals may be determined.

To apply the data transformation scheme, the data symbol sequence output from the S/P converter 1401 may pass through an interleaver 1402. A used interleaving method may be implemented in a similar manner to those described with reference to FIGS. 7 and 13.

The interleaved N/2-length data symbol sequence may be multiplied by a predetermined N/2-length sequence in a sequence multiplication processor 1403 (sequence multiplication or Hadamard transform). U different sequences which are multiplied may be orthogonal to each other. For example, U predetermined different sequences may be configured by selecting U rows from among the rows of an N/2×N/2 Hadamard matrix.

The data symbol sequence which has passed through the sequence multiplication processor 1403 may be DFT-precoded by an N/2-point DFT 1404.

The transmitter may define a DMRS sequence set 1405 including a plurality of different DMRS sequences. The number of the different DMRS sequences is U, and their length is N/2. If the U different DMRS sequences are input to a JM-point IDFT 1406, U different candidate signals may be generated by IDFT. The different DMRS sequences 1405 may be generated using, for example, cyclic shifts of a Zadoff-chu sequence as used when DFT (DFT precoding) is applied on NR UL. In another example, a method of generating different DMRS sequences modulated in QPSK, while changing an initial value "c_init" applied for generation of a pseudo-random sequence (see 7.4.1.1 of 3GPP TS38.211) may be used as used on NR DL. Information about the DMRS sequence set 1405 may be preliminarily transmitted to the UE through RRC signaling or a physical layer channel. In an embodiment, the DMRS sequences may be predetermined by a standard or a system operator and pre-stored during manufacturing of the BS and the UE. The plurality of DMRS sequences may be configured to correspond one-to-one to the plurality of data transformation schemes. For example, a $U^{th}$ DMRS sequence may be linked one-to-one to a $U^{th}$ data transformation scheme. In this case, when the $U^{th}$ data transformation scheme is applied as the data transformation scheme, the $U^{th}$ DMRS sequence may be used in a DMRS sequence combination.

A DFT-precoded N/2-length data symbol sequence and an N/2-length DMRS sequence may be multiplexed in the frequency domain (i.e., FDM) before the IDFT 1406. When FDM is performed, data symbols of the DFT-performed data symbol sequence and DMRS symbols of the DMRS sequence may be alternately mapped to input taps of the IDFT 1406. For example, the data symbols may be mapped to taps corresponding to a $1^{st}$ subcarrier, a $3^{rd}$ subcarrier, a $5^{th}$ subcarrier . . . among the input taps of the IDFT 1406, and the DMRS symbols may be mapped to taps corresponding to a $2^{nd}$ subcarrier, a $4^{th}$ subcarrier, a $6^{th}$ subcarrier . . . among the input taps of the IDFT 1406. Further, JM-N input taps are zero-padded, for oversampling, and thus the data symbols, the DMRS symbols, and zero symbols may be mapped to the input taps of the JM-point IDFT 1406.

PAPR measurers 1407 measure the PAPR values of time-domain JM-length signals on which IDFT has been performed. A total of U different candidate signals may be generated and the PAPR value of each candidate signal may be measured, by repeating the above processes in the devices 1401, 1402, 1403, 1404, 1405, and 1406 based on the U data transformation schemes included in the data transformation set and the U DMRS sequences included in the DMRS sequence set. A signal selector 1408 may identify a signal having a lowest PAPR among them. For example, when a $U^{th}$ candidate signal has the lowest PAPR, the $U^{th}$ candidate signal may be identified. Subsequently, a CP adder 1409 adds a CP to the signal having the lowest PAPR (herein, a $U^{th}$ signal to a $U^{th}$ data transformation scheme is applied and which is multiplexed with a $U^{th}$ DMRS sequence), serializes the CP-added signal, and transmits the serialized signal.

In an embodiment, a DMRS sequence index indicating the DMRS sequence applied to the signal selected by the signal selector 1408 may be transmitted to the UE through a physical layer channel or RRC signaling.

Through the embodiments of FIGS. 12 to 14, the transmitter may identify a signal with a lowest PAPR and use the signal for communication, thereby reducing resource waste and interference and thus enabling communication with a certain quality guaranteed.

Figure 15:
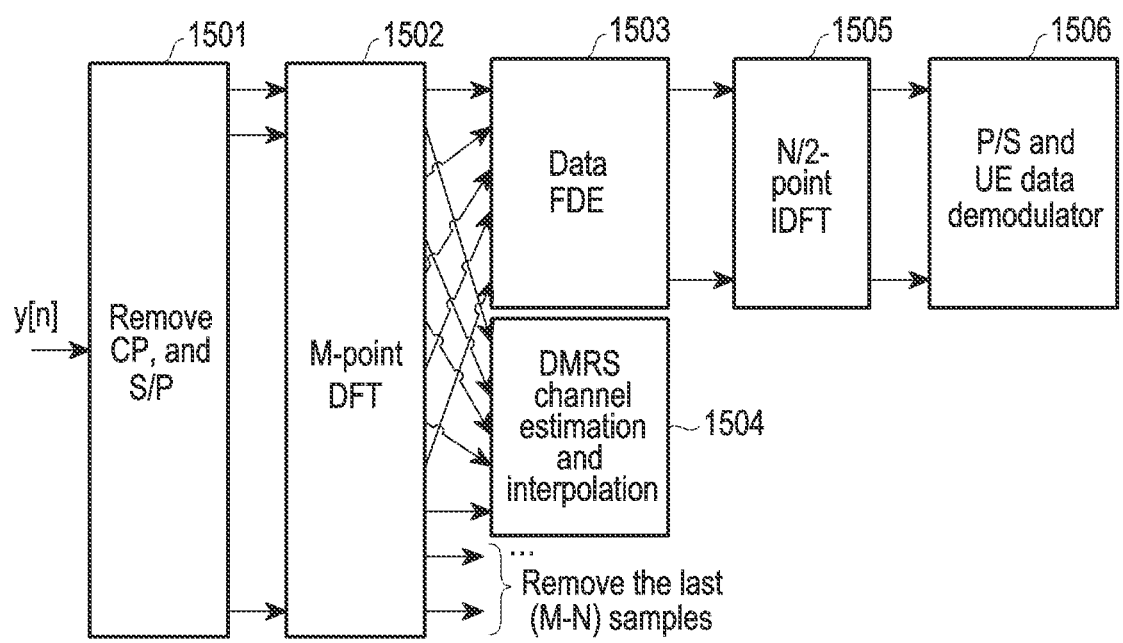
FIG. 15 is a block diagram illustrating a receiver for receiving a signal including a selected DMRS sequence according to an embodiment of the disclosure.

FIG. 15 is a block diagram illustrating a receiver for receiving a signal including a selected DMRS sequence according to an embodiment of the disclosure. The receiver may be a receiver of a UE or a BS. While operations will be described below as being performed by the receiver, it may be described as being performed by the receiver under the control of a processor.

The receiver may preliminarily receive information about a DMRS sequence set including different DMRS sequences through RRC signaling or a physical layer channel. In an embodiment, the DMRS sequence set may be predetermined by a standard or a system operator and pre-stored during manufacturing of the BS or the UE. The DMRS sequence set may be described similarly to FIGS. 6 to 11.

First, a description will be given of an operation of the receiver, when control information including a DMRS sequence index indicating a DMRS sequence selected by the BS is not received through separate signaling.

A CP remover 1501 performs CP removal and serial-to-parallel conversion on a signal y[n] received from the BS. An output signal of the CP remover 1501 is transformed into a frequency-domain signal (i.e., DFT) by an M-point DFT 1502, and the transformed signal is input to a data compensator (data frequency domain equalization (FDE)) 1503 and a channel estimator 1504. In an embodiment, the DFT signal may be separated into a data signal part and a DMRS sequence part by subcarrier demapping. The last M-N samples may be a zero padding and removed. The channel estimator 1504 may perform channel estimation on the received signal input through the M-point DFT 1502 using a plurality of DMRS sequences included in the known DMRS sequence set. In an embodiment, channel information for each subcarrier in the frequency domain may be obtained by performing interpolation after the channel estimation. The data compensator 1503 compensates for channel distortion of a data signal included in the received signal by performing FDE using the estimated channel information. Compensated signals are input to a data demodulator/decoder 1506 through an N/2-point IDFT 1505. The data demodulator/decoder 1506 may demodulate and decode each of a plurality of signals received through the IDFT, and restore and obtain data bits from a decoding result with a successful CRC among decoding results.

In another embodiment, a description will be given of an operation of the receiver when control information including a DMRS sequence index indicating a DMRS sequence selected by the BS is received through separate signaling. While not shown, the control information may be received through a physical layer channel or RRC signaling and input to the channel estimator 1504.

The channel estimator 1504 may identify the DMRS sequence selected by the BS through the DMRS sequence index included in the control information. Subsequently, the channel estimator 1504 may perform channel estimation on the received signal input through the M-point DFT 1502 based on the identified DMRS sequence. The data compensator 1503 compensates for channel distortion in the data signal included in the received signal input through the M-point DFT 1502, using the estimated channel information, and the compensated signal is input to the data demodulator/decoder 1506 through the N/2-point IDFT 1505. The data demodulator/decoder 1506 may obtain data bits by demodulating and decoding the signal input through the IDFT 1505.

Figure 16:
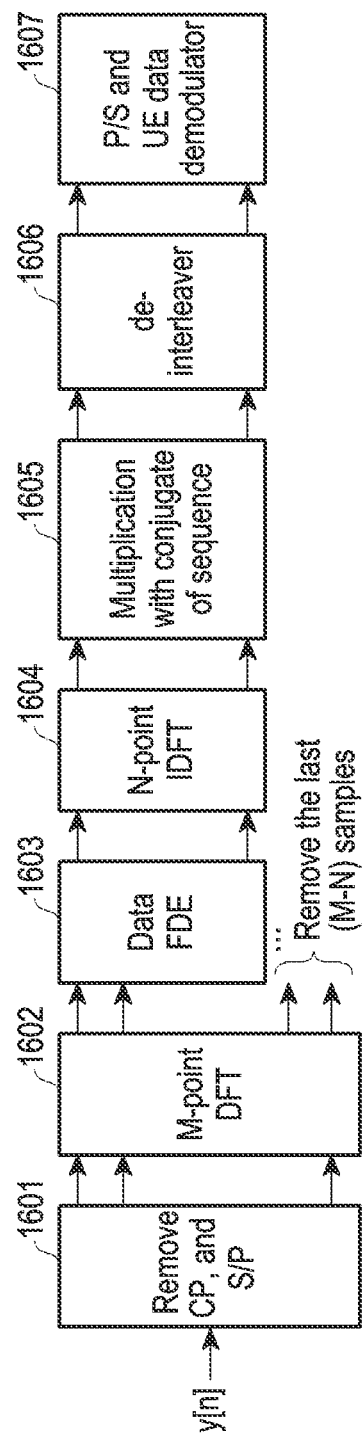
FIG. 16 is a block diagram illustrating a receiver for receiving a signal to which a selected data transformation scheme is applied according to an embodiment of the disclosure.

FIG. 16 is a block diagram illustrating a receiver for receiving a signal to which a data transformation scheme is applied according to an embodiment of the disclosure. The receiver may be a receiver of a UE or a BS. While operations will be described below as being performed by the receiver, it may be described as being performed by the receiver under the control of a processor.

The receiver may preliminarily receive information about a data transformation set including different data transformation schemes through RRC signaling or a physical layer channel. In an embodiment, the data transformation set may be predetermined by a standard or a system operator and pre-stored during manufacturing of a BS or a UE. The data transformation schemes may be configured similarly to FIGS. 6 to 11.

First, a description will be given of an operation of the receiver, when control information including a data transformation index indicating a data transformation scheme selected by the BS is not received through separate signaling.

A CP remover 1601 performs CP removal and serial-to-parallel conversion on a signal y[n] received from the BS. An output signal of the CP remover 1601 is transformed into a frequency-domain signal (i.e., DFT) by an M-point DFT 1602, and the transformed signal is input to a data compensator 1603. The last M-N samples may be a zero padding and removed. The data compensator 1603 compensates for channel distortion of a data signal included in the received signal. The compensated signal may be IDFT-processed by an N-point IDFT 1604. The IDFT signal may be inversely transformed through a sequence multiplication processor 1605 and a deinterleaver 1606. The sequence multiplication processor 1605 may identify a plurality of inverse matrixes corresponding to conjugate sequences corresponding to sequences used in sequence multiplication or a plurality of inverse matrices corresponding to sequence multiplication matrices from a plurality of data transformation schemes included in the known data transformation set. The sequence multiplication processor 1605 performs sequence multiplications on the IDFT signal, using the identified plurality of conjugate sequences or inverse matrices.

The deinterleaver 1606 may identify a plurality of permutation matrices for deinterleaving from the plurality of data transformation schemes included in the data transformation set. The deinterleaver 1606 deinterleaves data signals which have been subjected to sequence multiplication, using the identified plurality of permutation matrices for deinterleaving. A data demodulator/decoder 1607 may demodulate and decode each of a plurality of inversely transformed signals received through the deinterleaver 1606, and restore and obtain data bits from a decoding result with a successful CRC among decoding results.

In another embodiment, a description will be given of an operation of the receiver when control information including a data transformation index indicating a data transformation scheme selected by the BS is received through separate signaling. While not shown, the control information may be received through a physical layer channel or RRC signaling and input to the sequence multiplication processor 1605 and the deinterleaver 1606.

The sequence multiplication processor 1605 may identify the data transformation scheme selected by the BS through the data transformation index included in the control information, and identify a sequence used for sequence multiplication of the identified data transformation scheme. In an embodiment, the sequence multiplication processor 1605 may perform sequence multiplication on the IDFT signal, using a conjugate sequence corresponding to the identified sequence. In an embodiment, the sequence multiplication processor 1605 may perform sequence multiplication on the IDFT signal, using an inverse matrix corresponding to a matrix used for the sequence multiplication.

The deinterleaver 1606 may identify the data transformation scheme selected by the BS through the data transformation index included in the control information, and identify a permutation matrix for interleaving of the identified data transformation scheme. The deinterleaver 1606 performs deinterleaving on the sequence multiplication-processed signal using a permutation matrix for deinterleaving corresponding to the selected permutation matrix for interleaving.

The data demodulator/decoder 1607 may obtain data bits by demodulating and decoding the inversely transformed signal output from the deinterleaver 1606.

Figure 17:
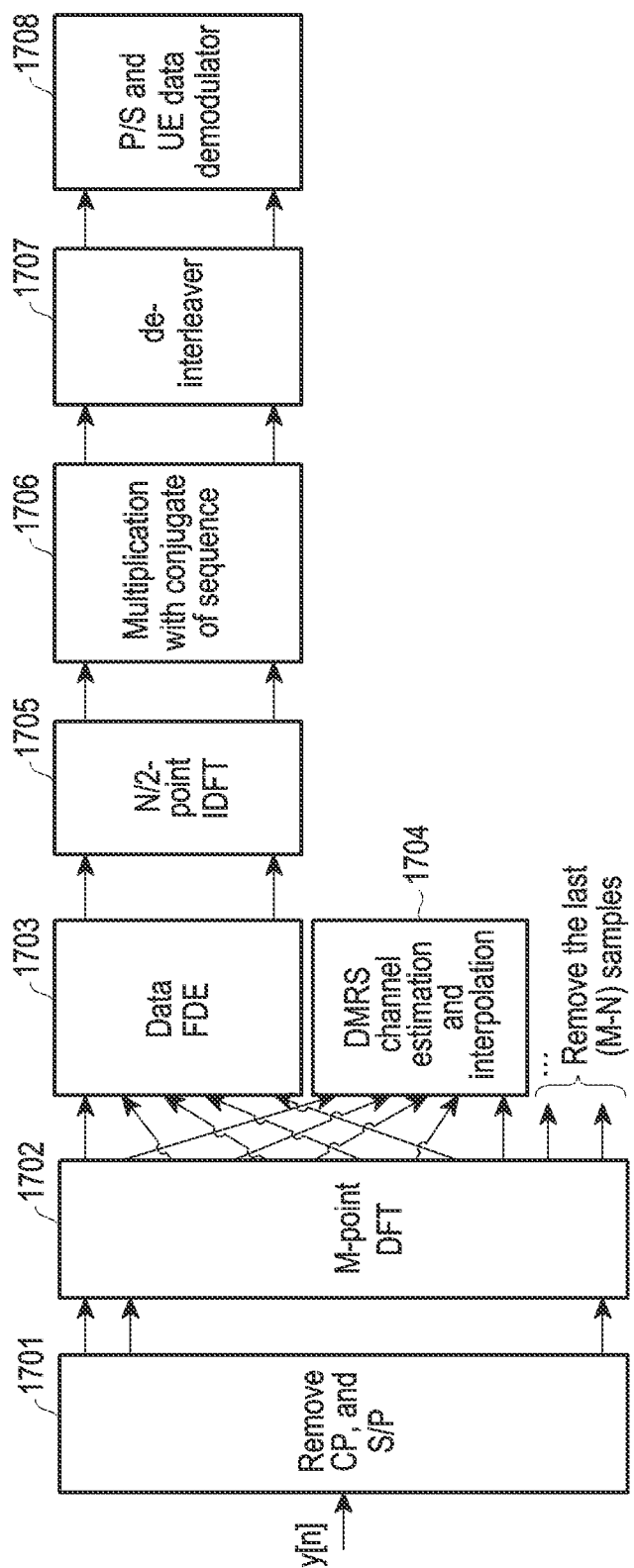
FIG. 17 is a block diagram illustrating a receiver for receiving a signal to which a selected data transformation scheme and DMRS sequence are applied according to an embodiment of the disclosure.

FIG. 17 is a block diagram illustrating a receiver for receiving a signal to which a selected data transformation scheme and a selected DMRS sequence are applied according to an embodiment of the disclosure. The receiver may be a receiver of a BS or a UE. While operations will be described below as being performed by the receiver, they may be described as being performed by the receiver under the control of a processor.

The receiver may preliminarily receive information about a DMRS sequence set including different DMRS sequences and information about a data transformation set including different data transformation schemes through RRC signaling or a physical layer channel. In an embodiment, the DMRS sequence set and the data transformation set may be predetermined by a standard or a system operator and pre-stored during manufacturing of the BS or the UE. A description of the DMRS sequence set and the data transformation set may be similar to that given with reference to FIGS. 6 to 11.

First, an operation of the receiver when control information including a DMRS sequence index indicating a DMRS sequence selected by the BS and a data transformation index indicating a data transformation scheme selected by the BS is not received through separate signaling will be described.

A CP remover 1701 performs CP removal and serial-to-parallel conversion on a signal y[n] received from the BS. An output signal of the CP remover 1701 is transformed into a frequency-domain signal (DFT) by an M-point DFT 1702, and the transformed signal is input to a data compensator 1703 and a channel estimator 1704. In an embodiment, the DFT signal may be separated into a data signal part and a DMRS sequence part by subcarrier demapping. The last M-N samples may be a zero padding and removed through subcarrier demapping. The channel estimator 1704 may perform channel estimation on the received signal input through the M-point DFT 1702, using the plurality of DMRS sequences included in the known DMRS sequence set. In an embodiment, the channel estimator 1704 may obtain channel information for each subcarrier in the frequency domain by performing interpolation after the channel estimation. The data compensator 1703 compensates for channel distortion in a data signal included in the received signal by using a plurality of pieces of channel information corresponding to the plurality of DMRS sequences. The compensated signals may be IDFT-processed by an N/2-point IDFT 1705. The IDFT signal may be inversely transformed through a sequence multiplication processor 1706 and a deinterleaver 1707. The sequence multiplication processor 1706 may identify conjugate sequences corresponding to sequences used in sequence multiplication or a plurality of inverse matrices corresponding to sequence multiplication matrices from the plurality of data transformation schemes included in the known data transformation set. The sequence multiplication processor 1706 performs sequence multiplications on the IDFT signal, using the identified plurality of conjugate sequences or inverse matrices.

The deinterleaver 1707 may identify a plurality of permutation matrices for deinterleaving from the plurality of data transformation schemes included in the data transformation set. The deinterleaver 1707 deinterleaves data signals which have been subjected to sequence multiplication, using the identified plurality of permutation matrices for deinterleaving. A data demodulator/decoder 1708 may demodulate and decode each of a plurality of inversely transformed signals received through the deinterleaver 1707, and restore and obtain data bits from a decoding result with a successful CRC among decoding results.

In another embodiment, a description will be given of an operation of the receiver when control information including a DMRS sequence index indicating a DMRS sequence selected by the BS and a data transformation index indicating a data transformation scheme selected by the BS is received through separate signaling. While not shown, the control information may be received through a physical layer channel or RRC signaling and input to the channel estimator 1704, the sequence multiplication processor 1706, and the deinterleaver 1707.

The channel estimator 1704 may identify the DMRS sequence selected by the BS through the DMRS sequence index included in the control information. Subsequently, the channel estimator 1704 may perform channel estimation on the received signal input through the M-point DFT 1702 based on the identified DMRS sequence. The data compensator 1703 compensates for channel distortion in the data signal included in the received signal input through the M-point DFT 1702, using the estimated channel information, and the compensated signal may pass through the N/2-point IDFT 1705.

The sequence multiplication processor 1706 may identify the data transformation scheme selected by the BS through the data transformation index included in the control information, and identify a sequence used for sequence multiplication of the identified data transformation scheme. In an embodiment, the sequence multiplication processor 1706 may perform sequence multiplication on the IDFT signal, using a conjugate sequence corresponding to the identified sequence. In an embodiment, the sequence multiplication processor 1706 may perform sequence multiplication on the IDFT signal, using an inverse matrix corresponding to a matrix used for the sequence multiplication.

The deinterleaver 1707 may identify the data transformation scheme selected by the BS through the data transformation index included in the control information, and identify a selected permutation matrix for interleaving through the identified data transformation scheme. The deinterleaver 1707 performs deinterleaving on the sequence multiplication-processed signal using a permutation matrix for deinterleaving corresponding to the selected permutation matrix for interleaving.

The data demodulator/decoder 1708 may obtain data bits by demodulating and decoding the inversely transformed signal output from the deinterleaver 1707.

In an embodiment, the plurality of DMRS sequences may be configured to correspond one-to-one to the plurality of data transformation schemes. For example, a $U^{th}$ DMRS sequence may be linked to a $U^{th}$ data transformation scheme. In this case, if a $U^{th}$ data transformation scheme is applied as the data transformation scheme, the $U^{th}$ DMRS sequence may be used in a DMRS sequence combination. Computational complexity may be reduced through the above embodiment.

Figure 18:
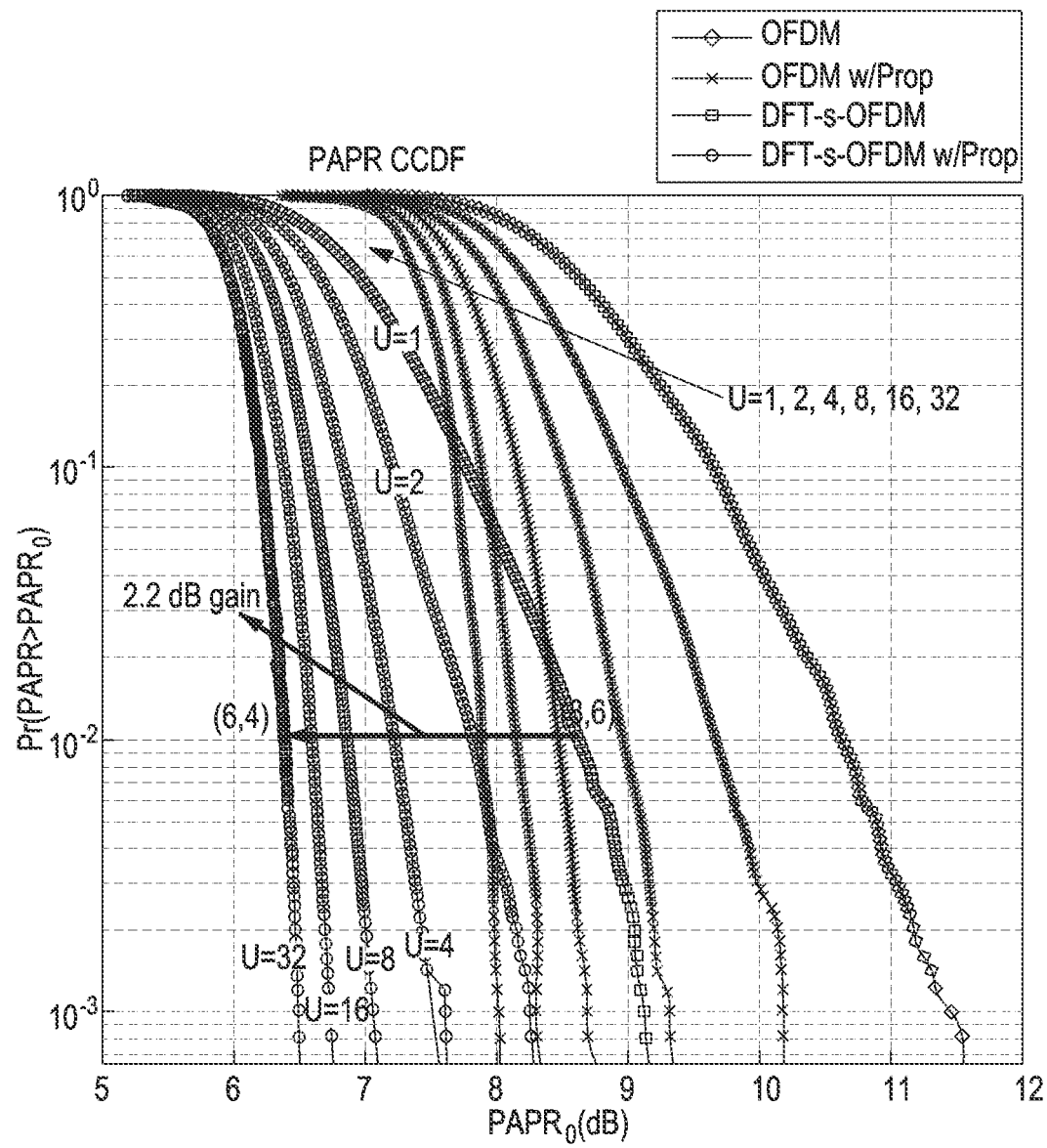
FIG. 18 is a graph showing a correlation between the size of a data transformation set and a PAPR according to an embodiment of the disclosure.

FIG. 18 is a graph illustrating a correlation between the size of a data transformation set and a PAPR according to an embodiment of the disclosure. The results in FIG. 18 show values of a complementary cumulative distribution function (CCDF) $\Pr[PAPR>PAPR_0]$ for PAPR distribution. The values used herein are N=360, M=512, and J=4, which may correspond to J, M, and N used in FIGS. 6 to 17. FIG. 18 illustrates PAPR results for a PDSCH in an OFDM environment to which DFT precoding is applied. The sizes U of data transformation sets are 1, 2, 4, 8, 16, and 32. In the graph of FIG. 18, a black solid line including diamonds and X's represents a PAPR result for OFDM, and a red solid line including squares and circles represents a PAPR result for DFT-spreading-OFDM (DFT-s-OFDM). In DFT-s-OFDM, as the size of the data transformation set increases, $PAPR_0$ which satisfies $\Pr[PAPR>PAPR_0]=10^{-2}$ decreases, and thus PAPR improvement may be identified. For example, when the value of U is increased from U=1 to U=32, $PAPR_0$ decreases from $PAPR_0$=8.6 dB to $PAPR_0$=6.4 dB, and thus a PAPR decrease of about 2.3 dB may be identified. Similarly, even if the proposed technique is applied to OFDM, performance may be improved.

When the size U of the data transformation set increases, DFT blocks, IDFT blocks, interleaving blocks, sequence multiplication blocks, and PAPR measurement blocks may increase in multiples, thereby increasing computational complexity. Accordingly, the BS or the UE may determine a data transformation set in consideration of a PAPR gain and computational complexity resulting from adjustment of the size of the data transformation set.

Figure 19:
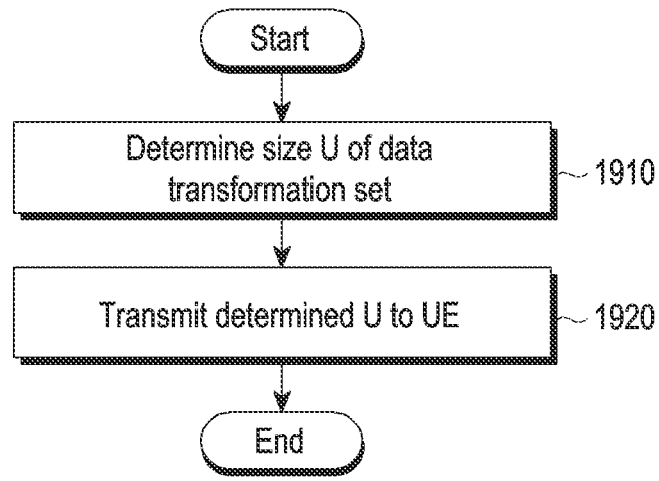
FIG. 19 is a flowchart illustrating an operation of determining the size of a data transformation set according to an embodiment of the disclosure.

FIG. 19 is a flowchart illustrating an operation of determining the size of a data transformation set according to an embodiment of the disclosure. While the operation of the flowchart will be described below as being performed by a BS, a similar operation may also be performed by a UE. A description related to determining the size of a data transformation set in FIG. 19 may be applied to the embodiments of FIGS. 6 to 17. When determining the size of a data transformation set, the BS should consider an achievable PAPR gain and computational complexity together and also consider a system environment, memory, computing power, and so on (1910). Information about the size U of the data transformation set determined by the BS may be transmitted to the UE through a physical layer channel or RRC signaling (1920). Through the above embodiment, computational complexity and a PAPR gain may be adjusted according to circumstances.

Figure 20:
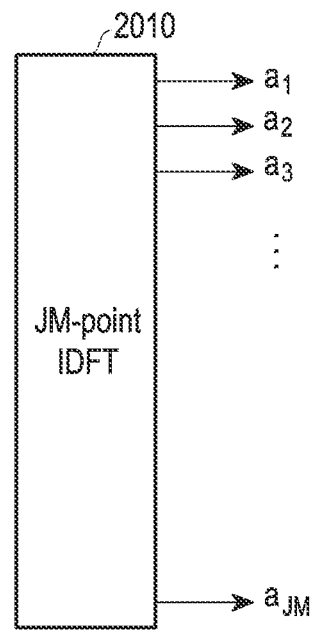
FIG. 20 illustrates an embodiment of an inverse discrete Fourier transform (IDFT) method in a transmitter according to an embodiment of the disclosure.

FIG. 20 illustrates an embodiment of an IDFT method of a transmitter.

The operation of the illustrated embodiment may be applied to both the BS and the UE in FIGS. 6 to 18.

The transmitter measures the PAPR of a JM-point IDFT time-domain data signal. On the assumption that the length of a modulated data symbol sequence to be transmitted by the transmitter is N, an oversampling effect is applied through N-point DFT, JM-point IDFT, and JM-N zero padding, and thus the length of the time-domain data signal may be J*M. As illustrated in FIG. 20, it may be assumed that an output sample sequence resulting from IDFT of a JM-point IDFT 2010 is $a_1, a_2, \ldots a_{JM}$. When a peak is detected for PAPR measurement, the value of a sample with a largest square of an absolute value among $a_1, a_2, \ldots a_{JM}$ corresponds to the peak. The index $ind_n$ of an $n^{th}$ sample among $a_1, a_2, \ldots a_{JM}$ searched to detect the peak may be expressed as Equation 1 below.

$$ind_n = n, n = 1, \ldots JM \qquad \text{Equation 1}$$

However, in this embodiment, to reduce the complexity of peak search, the number of index searches may be reduced by a method described in Equation 2 below.

$$ind_n = \text{round}\left(Qn - \frac{Q}{2} + 1\right), \qquad \text{Equation 2}$$
$$n = 1 \ldots, N$$

Herein, round ( ) is a step to detect a closest integer, and Q is an effective oversampling factor which may be represented as Q=JM/N. In a comparison between Equation 1 and Equation 2, a search range used to detect a peak may be reduced from J*M to N. For example, when M=512, N=512, and J=4, a largest peak should be detected by searching samples from sample 1 to sample 2048 (J*M), that is, all 2048 samples according to Equation 1 related to a conventional search method. However, in Equation 2 related to a method of reducing complexity, since Q=4, it may be determined that even detection of a largest peak by searching $ind_n$=3, 7, 11, . . . , 2047, that is, only 512 samples among time-domain samples from 1 to 2048 (=J*M) is almost similar to detection of a peak among 2048 samples as in Equation 1. Accordingly, the number of index searches is reduced, thereby reducing PAPR measurement complexity. The above PAPR search method may reduce computational complexity, thereby reducing load and preventing resource waste.

In an embodiment, the BS may provide the UE with two types of information illustrated in Table 8 by control information. The following embodiment may be applied to both the BS and the UE of FIGS. 6 to 18.

TABLE 8

| Field name | Bit | Note |
| --- | --- | --- |
| SameDataTransformation Length($\alpha$) | Flexible | The number of data symbols to which the same data transformation is applied among data symbols transmitted in one slot |

TABLE 8-continued

| Field name | Bit | Note |
|---|---|---|
| DataTransformationIndex(β) | $(\log_2 U)x \dfrac{\text{num.of symbols per slot}}{\alpha}$ | Bitmap information of a data transformation index required to decode one slot. Herein, $\dfrac{\text{num.of symbols per slot}}{\alpha}$ data transformations are applied in one slot, and each data transformation requires $\log_2 U$ bits. |

As illustrated in Table 8, SameDataTransformationLength (α) represents the number of symbols (which may be consecutive) to which the same data transformation is applied among data symbols transmitted in one slot covered by one PDCCH. For example, if SameDataTransformation-Length(α)=1, a different data transformation scheme may be applied to each symbol in one slot. In addition, when SameDataTransformationLength(α)=13 (where 13 may mean the number of data symbols excluding the PDCCH in one slot), the same data transformation scheme may be applied to all symbols in the slot. Therefore, the number of bits required to represent this value may vary depending on a BS configuration and requirements. In an embodiment, SameDataTransformationLength(α) may be set in slots, and may be fixed in consideration of a system environment, system memory, a system computation capacity, and so on or transmitted to the UE through RRC signaling rather than a physical layer channel (e.g., PDCCH).

DataTransformationIndex(β) is a bitmap representing a data transformation index applied to one slot. For example, when the number U of elements in a data transformation set is 4, the number of bits required to represent one data transformation scheme is 2 bits. In this case, if SameData-TransformationLength(α)=1 and there are 13 symbols in one slot, $$(\log_2 U) \times \dfrac{\text{num.of sumbols per slot}}{\alpha} = 2 \times \dfrac{13}{1} = 26$$

and thus DataTransformationIndex of 26 bits is transmitted. In an embodiment, DataTransformationIndex(β) may be transmitted to the UE through DCI on a PDCCH.

In an embodiment, data transformation schemes used in the embodiments of the disclosure may include operations such as interleaving and sequence multiplication. In addition, when the BS performs even DFT precoding, it should also perform matrix multiplication between a DFT matrix and a data vector. Herein, a interleaving matrix may be represented as a permutation matrix P, a sequence multiplication matrix may be represented as a diagonal matrix S, and a matrix for DFT precoding may be represented as a DFT matrix D. Although each of the three matrices may be multiplied for three operations to transform data, a data transformation scheme may be performed with less complexity by multiplying a composite matrix DxSxP including the three matrices by a data symbol sequence at once during each data transformation. The composite matrix may include only the interleaving permutation matrix and the sequence multiplication matrix. The receiver may perform data inverse transformation using an inverse matrix corresponding to the composite matrix.

Figure 21:
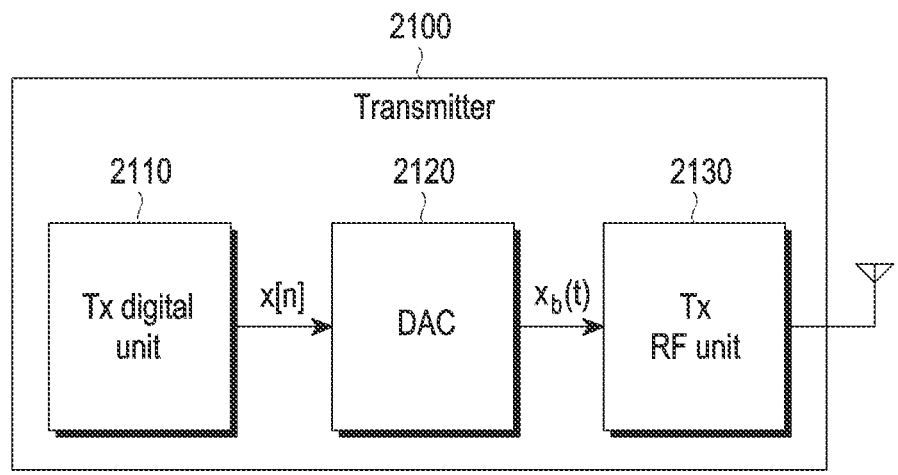
FIG. 21 is a block diagram illustrating a transmitter of a communication device according to an embodiment of the disclosure.

FIG. 21 is a block diagram illustrating a transmitter 2100 in a communication device. The transmitter may be a transmitter of a BS or a UE. While operations will be described below as being performed by the transmitter, they may be performed by the transmitter under the control of a processor.

A signal output from a transmission (Tx) digital unit 2110 of the transmitter 2100 is converted into a baseband analog signal through a digital-to-analog converter (DAC) 2120. The converted analog signal is converted into a pass band signal through a Tx radio frequency (RF) unit 2130 of the transmitter and transmitted to a receiver in a communication device. The Tx RF unit 2130 of the transmitter may include a mixer for up-converting the baseband analog signal to a carrier frequency, a phase shifter, a power amplifier (PA), and so on. The configuration of a transmitter illustrated in FIGS. 12 to 14 may be included in the Tx digital unit 2110 and generate a signal for reducing the PAPR of the baseband analog signal.

Figure 22:
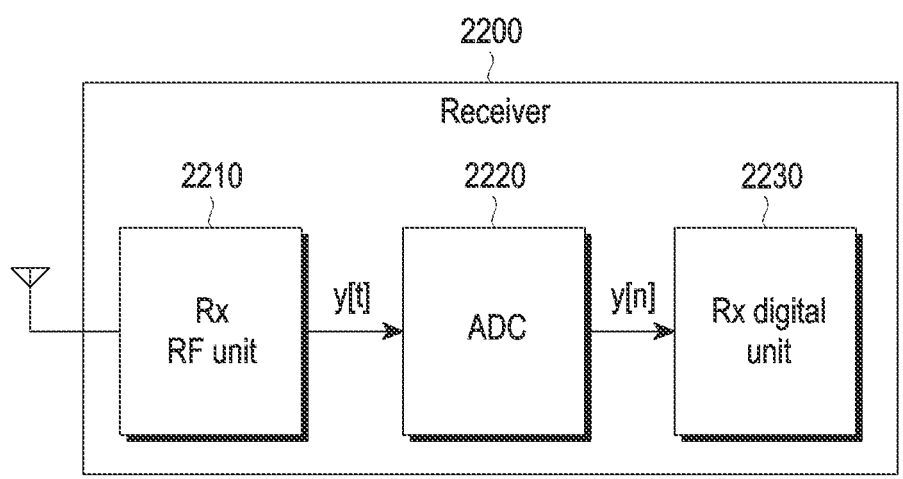
FIG. 22 is a block diagram illustrating a receiver of a communication device according to an embodiment of the disclosure.

FIG. 22 is a block diagram illustrating a receiver 2200 in a communication device. The receiver may be a receiver of a BS or a UE. While operations will be described below as being performed by the receiver, they may be performed by the receiver under the control of a processor.

A signal received from a communication device may be converted into a baseband analog signal through a reception (Rx) RF unit 2210 of the receiver, and then pass through an analog-to-digital converter (ADC) 2220. A digital signal that has passed through the ADC 2220 may be received by an Rx digital unit 2230 of the receiver. The configuration of a receiver illustrated in FIGS. 15 to 17 may be included in the Rx digital unit 2230 and restore data included in the digital signal.

Figure 23:
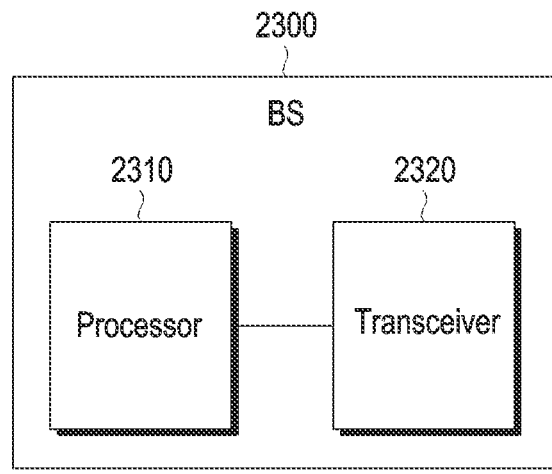
FIG. 23 illustrates the structure of a base station (BS) according to an embodiment of the disclosure.
Figure 24:
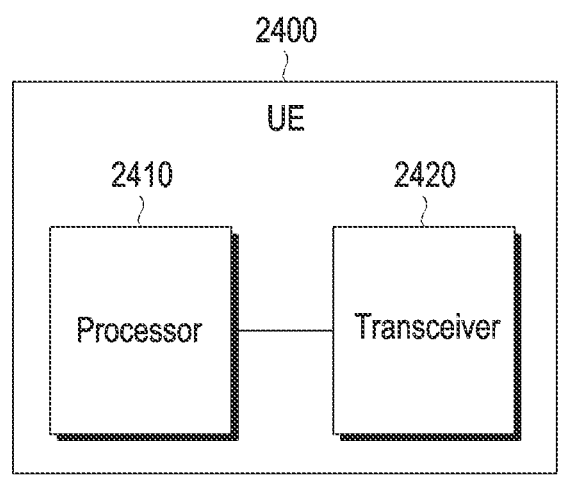
FIG. 24 illustrates the structure of a user equipment (UE) according to an embodiment of the disclosure.

FIGS. 23 and 24 illustrate the structures of a BS and a UE according to an embodiment of the disclosure. The BS and the UE of FIGS. 23 and 24 may operate according to the methods disclosed in the embodiments of FIGS. 6 to 30.

FIG. 23 illustrates the structure of a BS according to an embodiment of the disclosure. As illustrated in FIG. 23, the BS of the disclosure may include at least one processor 2310 and a transceiver 2320 including a transmitter and a receiver. The BS may include memory (not shown). The transceiver 2320 and the memory may be connected to the at least one processor 2310 so as to operate under the control of the processor 2310.

The at least one processor 2310 may control a series of processes so that the operations of the BS described in the embodiments of the disclosure may be performed. The transceiver 2320 may transmit and receive a signal to and from a UE 2400. The signal may include control information and data. The transceiver may include at least one of the configurations of the transmitter and the receiver illustrated in FIGS. 21 and 22.

FIG. 24 illustrates the structure of a UE according to an embodiment of the disclosure. As illustrated in FIG. 24, the UE of the disclosure may include at least one processor 2410 and a transceiver 2420 including a receiver and a transmitter. The UE may include memory (not shown). The transceiver 2420 and the memory may be connected to the at least one processor 2410 so as to operate under the control of the processor.

The at least one processor 2410 may control a series of processes so that the operations of the UE described in the embodiments of the disclosure may be performed.

The at least one processor 2410 may control a series of processes so that the operations of the UE described in the embodiments of the disclosure may be performed. The transceiver 2420 may transmit and receive a signal to and from the BS 2300. The signal may include control information and data. The transceiver may include the configurations of both the transmitter and the receiver illustrated in FIGS. 21 and 22.

Figure 25:
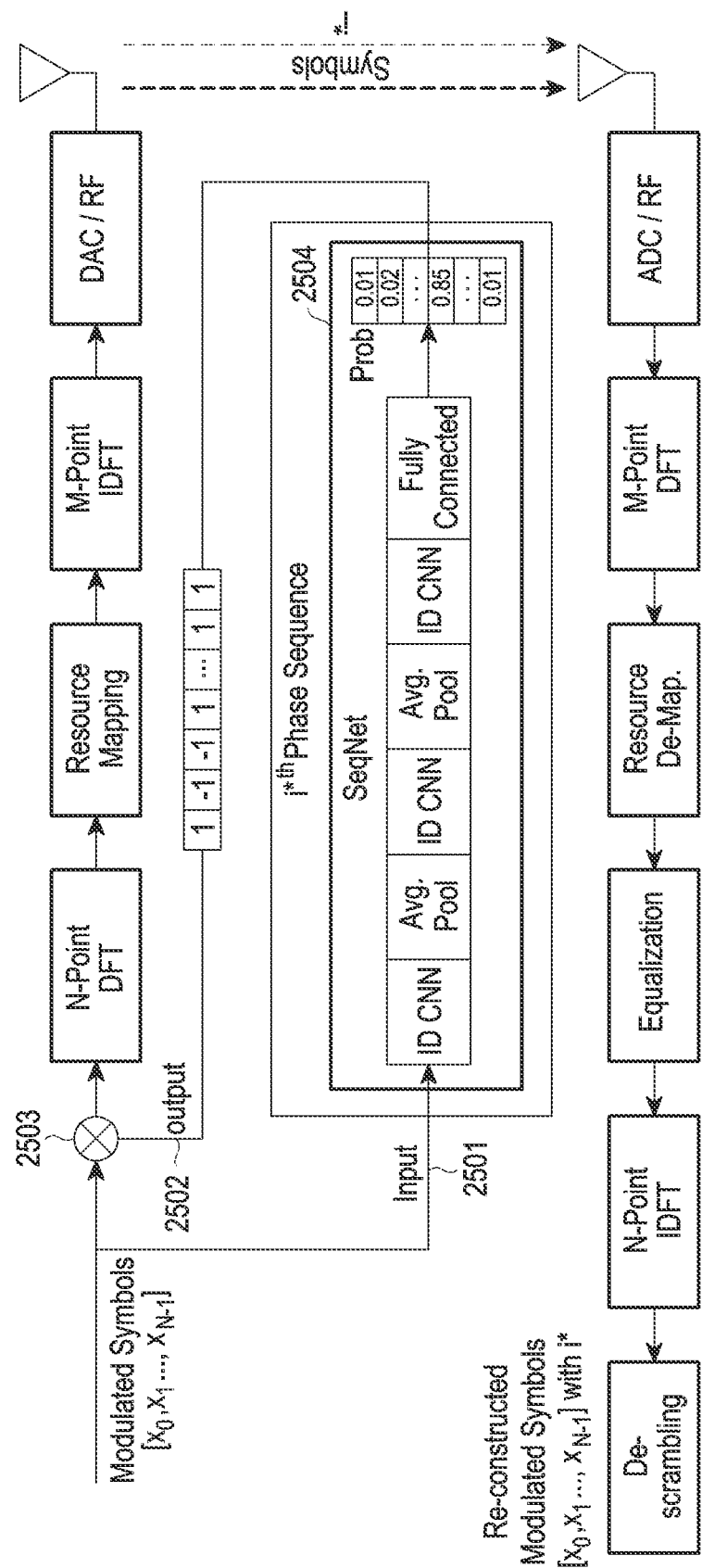
FIG. 25 is a diagram illustrating an example of an artificial intelligence structure for detecting a data transformation index according to an embodiment of the disclosure.

FIG. 25 is a diagram illustrating an example of an artificial intelligence (AI) structure for detecting a data transformation index according to an embodiment of the disclosure.

FIG. 25 may illustrate an example of detecting a most suitable data transformation index using AI technology, and configuring AI, rather than a method of detecting a data transformation index with a lowest PAPR by full search as illustrated in FIG. 13. In FIG. 25, a Hadamard-based sequence set is assumed, and interleaving is not considered. In addition, N modulation symbols are applied, and N-point DFT transmission and M-point IDFT transmission are assumed. The AI proposed in FIG. 25 is referred to as "sequence network (SeqNet)". SeqNet may derive a sequence index that minimizes a PAPR by inputting modulated symbols. An input to SeqNet may be a modulated symbol (2501), and probability mass function values for available data transformation indexes may be calculated and output (2502). The modulated symbols are multiplied by a data transformation index with a highest probability among probability values obtained from the modulated symbols and SeqNet (2503) and transmitted after DFT-spread-OFDM modulation. SeqNet of this example may be configured by combining a one-dimensional convolutional neural network (CNN), average pooling, fully connected layers, and so on (2504).

Figure 26:
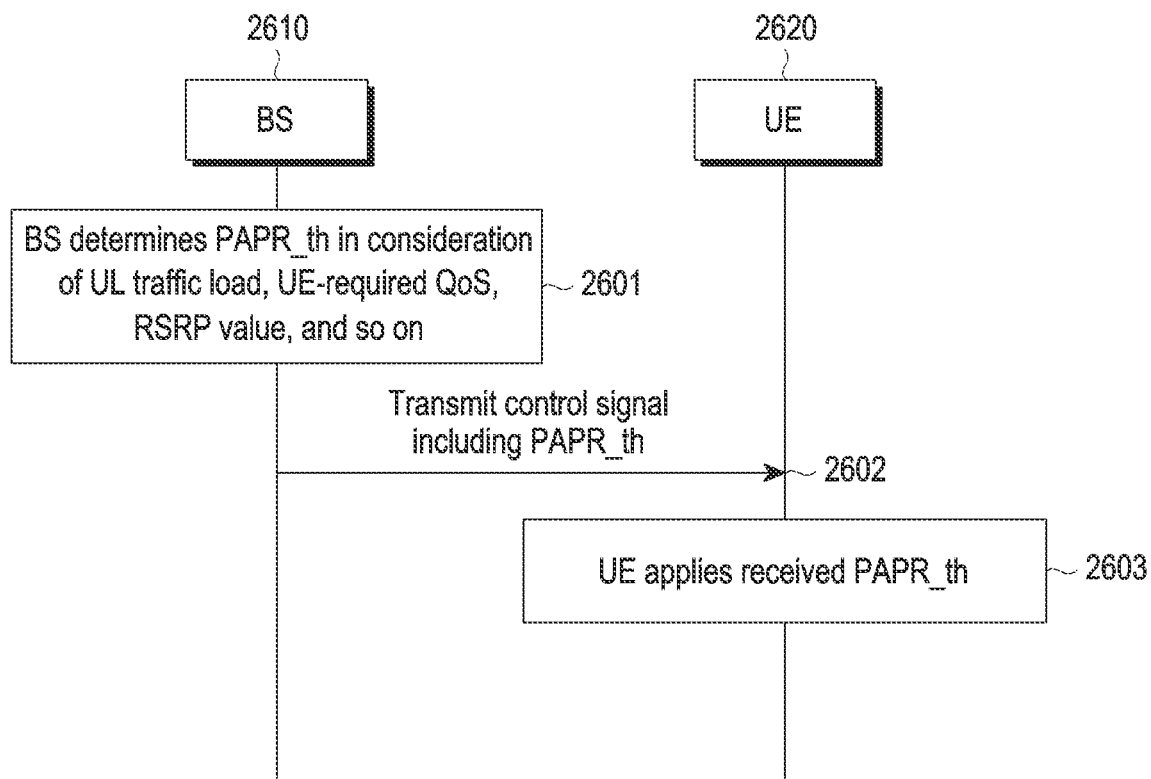
FIG. 26 is a flowchart for determining a PAPR_threshold according to an embodiment of the disclosure.

FIG. 26 is a flowchart for determining a PAPR_threshold according to an embodiment of the disclosure.

FIG. 26 may illustrate an operation process of a BS and a UE required to determine and apply a PAPR_threshold PAPR_th required to switch whether data is to be transformed.

Figure 29:
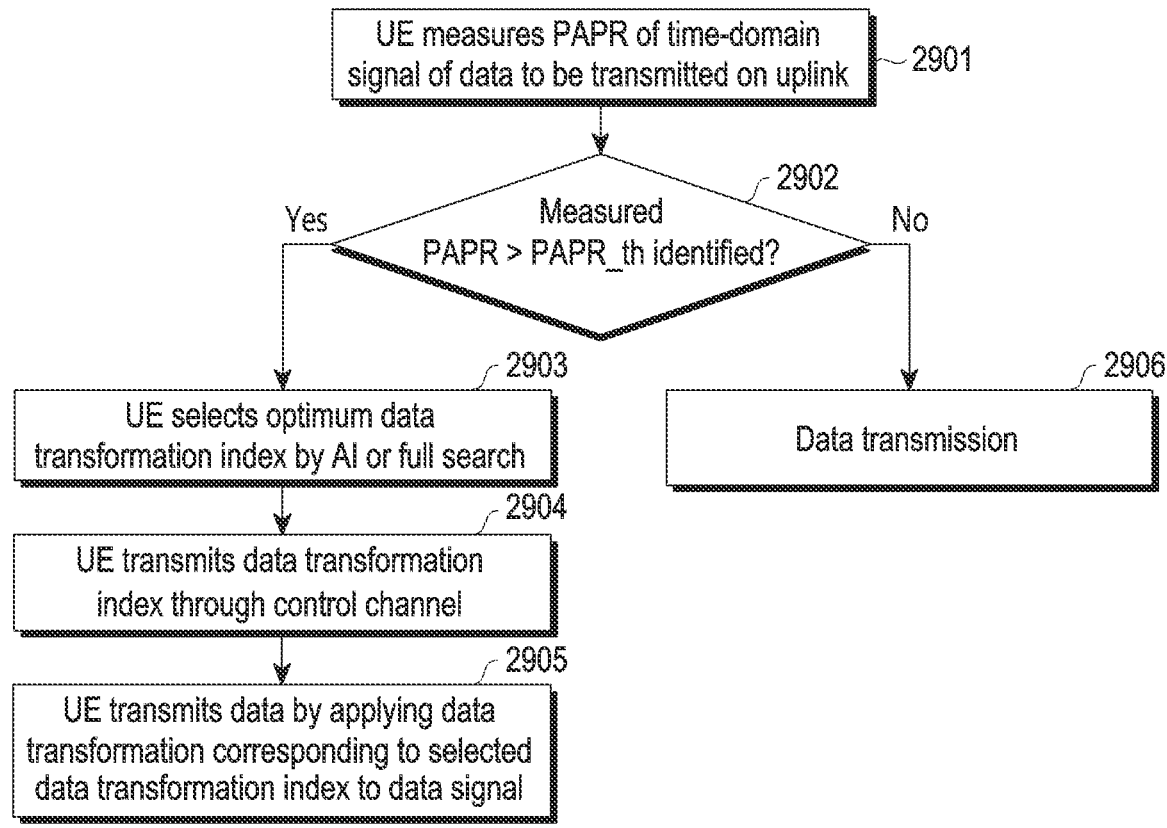
FIG. 29 is a flowchart illustrating an operation of determining whether to transform data and transmitting data to a BS by a UE according to an embodiment of the disclosure.

A BS 2610 may determine PAPR_th in consideration of the amount (or load) of traffic on UL which is currently served, a required quality of service (QOS) level of the UE, a reference signal received power (RSRP) value of the UE, an available computational capacity of the UE, and so on (2601). PAPR_th may be determined UE-specifically. For example, when the RSRP value of the UE is low, the BS may set PAPR_th low to improve the UL coverage of the UE. The BS 2610 may transmit PAPR_th to a UE 2620 through a control signal or an RRC message (2602). The UE 2620 may obtain information related to PAPR_th by decoding the control signal or the RRC message transmitted by the BS 2610 (2603) and apply the corresponding PAPR_th value as illustrated in FIGS. 27 and 29.

In another embodiment, the UE 2620 may directly determine PAPR_th in consideration of the required QoS level, the RSRP value of the UE, the computational capacity of the UE, and so on. The UE may transmit the determined PAPR_th to the BS 2610 through data or a control signal.

Figure 27:
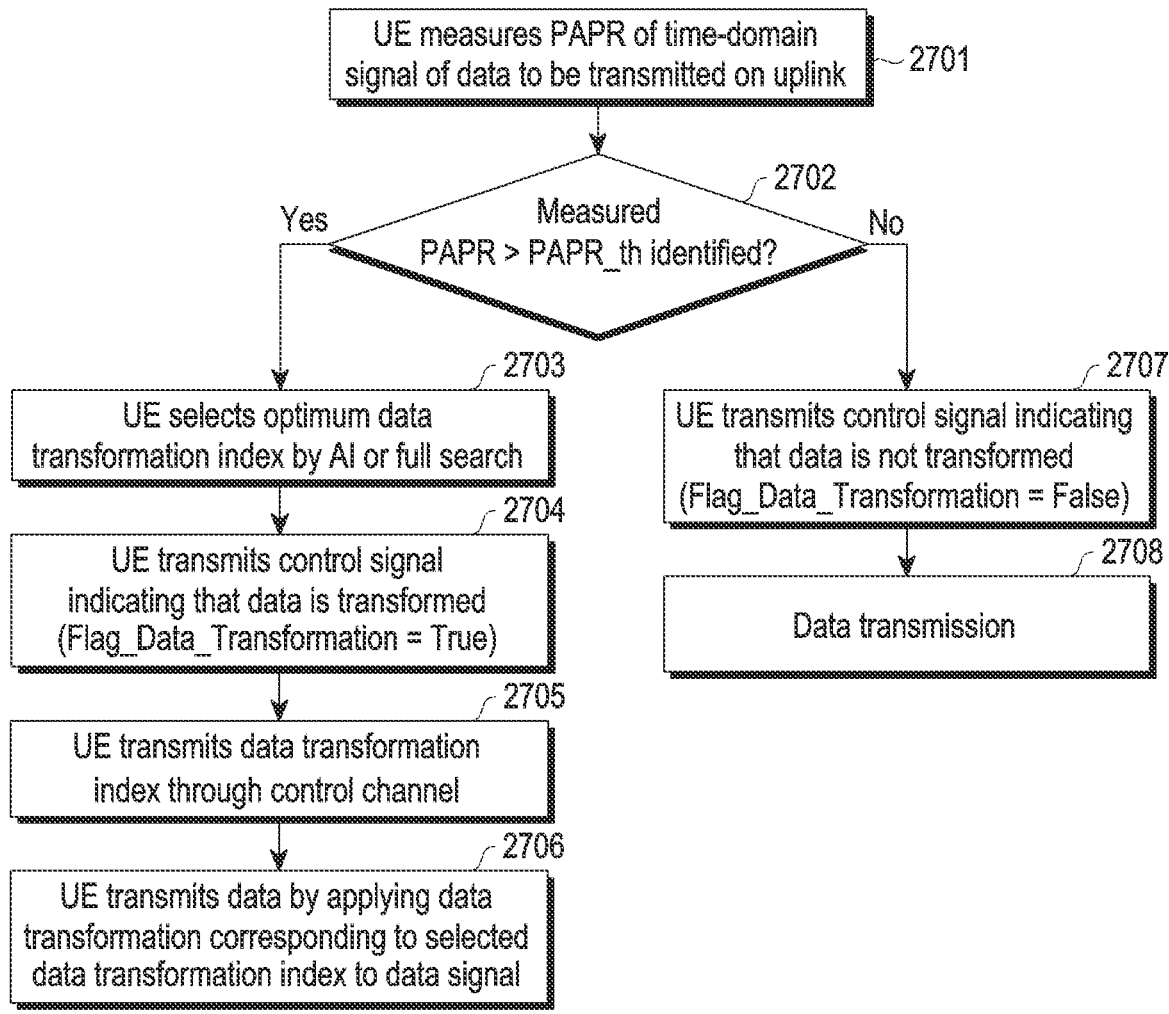
FIG. 27 is a flowchart illustrating an operation of determining whether to transform data and transmitting data to a BS by a UE according to an embodiment of the disclosure.

FIG. 27 is a flowchart for determining whether to transform data and transmitting data to a BS by a UE according to an embodiment of the disclosure.

The UE may measure the PAPR of a time-domain data signal to be transmitted on UL (2701). It may be identified whether the measured PAPR is greater than PAPR_th, which is a predetermined threshold (2702). PAPR_th may be determined in the manner described in FIG. 26 and stored in the UE. If the measured PAPR is greater than PAPR_th, the UE may select an optimum data transformation index by performing full search for measuring the PAPRs of all data transformations as illustrated in FIG. 13 or using AI (2703). The UE may then transmit information indicating that data has been transformed in a control signal to the BS. For example, when data has been transformed, information indicating that the data has been transformed, such as Flag_Data_Transformation=True, may be included in a UL control signal and transmitted (2704). The UE may transmit a signal including a selected data transformation index or related information to the BS as a control channel or data signal through a control channel (2705). After applying data transformation corresponding to the data transformation index to the selected data signal, the UE may transmit the transformed data to the BS (2706). A transmission order in steps 2704 to 2706 is not determined and transmissions may be performed individually.

If it is identified that the measured PAPR is less than PAPR_th in step 2702, the UE may transmit a UL control signal including information such as Flag_Data_Transformation=False as information indicating that data has not been transformed (2707). The UE may then transmit the data in a scheduled resource (2708).

When the PAPR is already small by setting a PAPR_threshold value and introducing the above method, a data transformation index is not used, thereby reducing unnecessary overhead. Further, as a desired PAPR_threshold is allowed to be set, it is possible to determine a case in which system improvement is required and to change the degree of system improvement.

Figure 28:
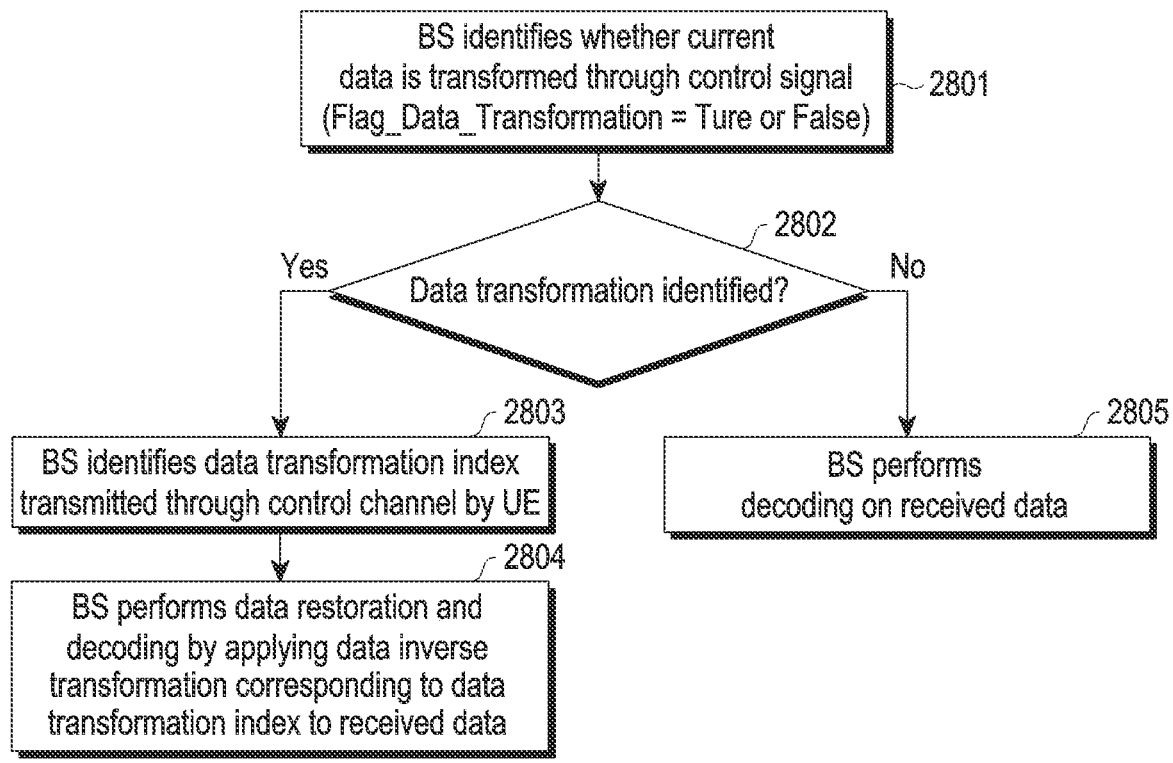
FIG. 28 is a flowchart illustrating an operation of identifying whether data has been transformed and receiving a data signal from a UE by a BS according to an embodiment of the disclosure.

FIG. 28 is a flowchart for identifying whether data has been transformed and receiving a data signal from a UE by a BS according to an embodiment of the disclosure.

The BS may receive a control signal transmitted by the UE and identify the value of information indicating whether data has been transformed (2801). For example, when data has been transformed, Flag_Data_Transformation=True, and when the data has not been transformed, Flag_Data_Transformation=False. The BS may identify whether the data has been transformed according to the information indicating whether the data has been transformed (2802). When identifying that the data has been transformed (Flag_Data_Transformation=True), the BS may identify information related to a data transformation index received from the UE through a control channel (2803). The BS may perform data restoration and data decoding by applying inverse transformation corresponding to the identified data transformation index to a data signal received from the UE (2804).

On the contrary, when identifying that the data has not been transformed (Flag_Data_Transformation=False) in step 2802, the BS may perform decoding on the data signal received from the UE without inverse transformation (2805).

FIG. 29 is a flowchart for determining whether to transform data and transmitting data to a BS by a UE according to an embodiment of the disclosure.

The UE may measure the PAPR of a time-domain data signal to be transmitted on UL (2901). It may be identified whether the measured PAPR is greater than PAPR_th, which is a predetermined threshold (2902). PAPR_th may be determined in the method described in FIG. 26 and stored in the UE. If the measured PAPR is greater than PAPR_th, the UE may select an optimal data transformation index by performing full search, which is a method of measuring PAPRs of all data transformations as illustrated in FIG. 13, or by using AI (2903). The UE may transmit a signal including the selected data transformation index or related information to the BS through a control channel (2904). After applying a data transformation corresponding to the data transformation index to a selected data signal, the UE may transmit the transformed data to the BS (2905).

If it is identified that the measured PAPR is less than PAPR_th in step 2902, the UE may transmit the data in a scheduled resource (2906).

Figure 30:
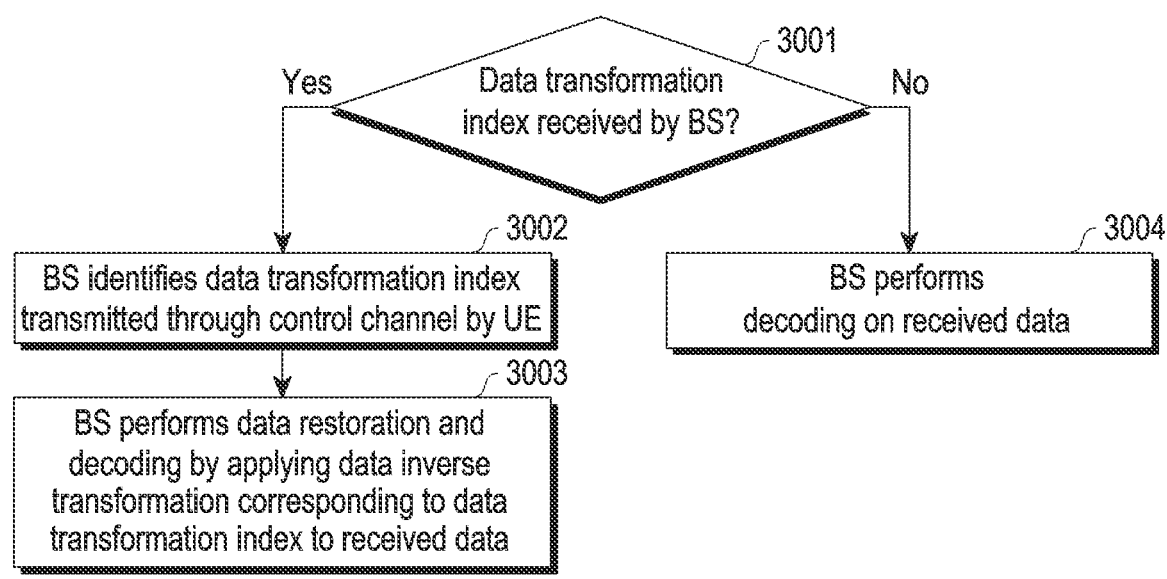
FIG. 30 is a flowchart illustrating an operation of receiving a data signal from a UE by a BS according to an embodiment of the disclosure.

FIG. 30 is a flowchart for receiving a data signal from a UE by a BS according to an embodiment of the disclosure.

The BS may determine whether information related to a data transformation index has been received from the UE through a control channel (3001). Upon receipt of the information related to the data transformation index from the UE, the BS may identify the data transformation index through the corresponding information (3002). The BS may perform data restoration and data decoding by applying an inverse transformation corresponding to the identified data transformation index to a data signal received from the UE (3003).

On the contrary, when determining that the information related to a data transformation index has not been received from the UE in step 3001, the BS may perform decoding on the data signal received from the UE without inverse transformation (3004).

The embodiments of the disclosure disclosed in the specification and drawings are only presented as specific examples to easily describe the technical idea of the disclosure and help understanding of the disclosure, not intended to limit the scope of the disclosure. That is, it is obvious to those skilled in the art that other modifications can be made based on the technical idea of the disclosure. Further, the above embodiments may be implemented in combination, when needed.

The invention claimed is:

1. A user equipment (UE) in a wireless communication system, comprising:
   a transceiver; and
   at least one processor coupled to the transceiver, and configured to:
      measure a peak-to-average power ratio (PAPR) of a data signal, wherein the data signal includes a modulated data symbol sequence,
      determine whether the measured PAPR is greater than a PAPR threshold,
      in case that the measured PAPR is greater than the PAPR threshold, select a data transformation index having a smallest PAPR among a plurality of data transformation
      indices, wherein the data transformation index indicates at least one scheme of a data transformation,
      transmit, to a base station (BS), information related to the selected data transformation index, and
      transmit, to the BS, a transformed data signal generated by applying the data transformation corresponding to the selected data transformation index to the data signal.

2. The UE of claim 1,
   wherein the at least one processor is further configured to:
      transmit, to the BS, a control signal including information indicating that the data signal is modified, and
   wherein the information indicating that the data signal is modified is implemented in a form of a flag.

3. The UE of claim 1,
   wherein the at least one processor is further configured to:
      in case that the measured PAPR is less than the PAPR threshold, transmit the data signal to the BS, and
      transmit, to the BS, a control signal including information indicating that the data signal is not transformed, and
   wherein the information indicating that the data signal is not transformed is implemented in a form of a flag.

4. The UE of claim 1,
   wherein the data transformation index is selected based on a first method of deriving a data transformation index for PAPR reduction, or a second method based on the plurality of data transformation indices,
   wherein the first method is implemented by a neural network, and
   wherein in case that a modulated symbol is input, the neural network outputs probability values for data transformation indices applicable to the modulated symbol.

5. The UE of claim 4,
   wherein the neural network comprises at least one of a one-dimensional convolutional neural network (CNN), average pooling, or fully connected layers.

6. A base station (BS) in a wireless communication system, comprising:
   a transceiver; and
   at least one processor coupled to the transceiver, and configured to:
      receive, from a user equipment (UE), information related to a data transformation index,
      receive, from the UE, a transformed data signal generated by applying a data transformation corresponding to a data transformation index to a data signal, wherein the data transformation index indicates at least one scheme of the data transformation and the data signal includes a modulated data symbol sequence, and
      inversely transform the transformed data signal based on the received information related to the data transformation index,
   wherein in case that a measured PAPR of the data signal is greater than a PAPR threshold, the data transformation index is selected among a plurality of data transformation
   indices and is related to a smallest a peak-to-average power ratio (PAPR).

7. The BS of claim 6,
   wherein the at least one processor is further configured to:
      receive, from the UE, a control signal including information indicating that the data signal is transformed, and
   wherein the information indicating that the data signal is transformed is implemented in a form of a flag.

8. The BS of claim 6,
   wherein the data transformation index is selected based on a first method of deriving a data transformation index for PAPR reduction, or a second method based on the plurality of data transformation indices, wherein the first method is implemented by a neural network, and wherein in case that a modulated symbol is input, the neural network outputs probability values for data transformation indices applicable to the modulated symbol.

9. The BS of claim 8, wherein the neural network comprises at least one of a one-dimensional convolutional neural network (CNN), average pooling, or fully connected layers.

10. A method of a user equipment (UE) in a wireless communication system, the method comprising:

measuring a peak-to-average power ratio (PAPR) of a data signal, wherein the data signal includes a modulated data symbol sequence;

determining whether the measured PAPR is greater than a PAPR threshold;

in case that the measured PAPR is greater than the PAPR threshold, selecting a data transformation index having a smallest PAPR among a plurality of data transformation indices, wherein the data transformation index indicates at least one scheme of a data transformation;

transmitting, to a base station (BS), information related to the selected data transformation index; and transmitting, to the BS, a transformed data signal generated by applying the data transformation corresponding to the selected data transformation index to the data signal.

11. The method of claim 10, further comprising:

transmitting, to the BS, a control signal including information indicating that the data signal is modified to the BS, wherein the information indicating that the data signal is modified is implemented in a form of a flag.

12. The method of claim 10, further comprising:

in case that the measured PAPR is less than the PAPR threshold, transmitting the data signal to the BS; and transmitting, to the BS, a control signal including information indicating that the data signal is not transformed, wherein the information indicating that the data signal is not transformed is implemented in a form of a flag.

13. The method of claim 10, wherein the data transformation index is selected based on a first method of deriving a data transformation index for PAPR reduction, or a second method based on the plurality of data transformation indices, wherein the first method is implemented by a neural network, and wherein in case that a modulated symbol is input, the neural network outputs probability values for data transformation indices applicable to the modulated symbol.

14. The method of claim 13, wherein the neural network comprises at least one of a one-dimensional convolutional neural network (CNN), average pooling, or fully connected layers.

15. A method of base station (BS) in a wireless communication system, the method comprising:

receiving, from a user equipment (UE), information related to a data transformation index;

receiving, from the UE, a transformed data signal generated by applying a data transformation corresponding to the data transformation index to a data signal, wherein the data transformation index indicates at least one scheme of the data transformation and the data signal includes a modulated data symbol sequence; and inversely transforming the transformed data signal based on the received information related to the data transformation index, wherein in case that a measured PAPR of the data signal is greater than a PAPR threshold, the data transformation index is selected among a plurality of data transformation indices and is related to a smallest a peak-to-average power ratio (PAPR).

16. The method of claim 15, further comprising:

receiving, from the UE, a control signal including information indicating that the data signal is transformed, wherein the information indicating that the data signal is transformed is implemented in a form of a flag.

17. The method of claim 15, wherein the data transformation index is selected based on a first method of deriving a data transformation index for PAPR reduction, or a second method based on the plurality of data transformation indices, wherein the first method is implemented by a neural network, and wherein in case that a modulated symbol is input, the neural network outputs probability values for data transformation indexes-indices applicable to the modulated symbol.

18. The method of claim 17, wherein the neural network comprises at least one of a one-dimensional convolutional neural network (CNN), average pooling, or fully connected layers.

* * * * *